(12) United States Patent
Hazel et al.

(10) Patent No.: US 11,762,876 B2
(45) Date of Patent: *Sep. 19, 2023

(54) DATA NORMALIZATION USING DATA EDGE PLATFORM

(71) Applicant: CHAOSSEARCH, INC., Andover, MA (US)

(72) Inventors: Thomas Hazel, Boston, MA (US); David Noblet, Londonderry, NH (US); Grant Mills, Littleton, MA (US)

(73) Assignee: CHAOSSEARCH, INC., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,413

(22) Filed: Oct. 4, 2021

(65) Prior Publication Data

US 2022/0027383 A1    Jan. 27, 2022

Related U.S. Application Data

(63) Continuation of application No. 16/289,300, filed on Feb. 28, 2019, now Pat. No. 11,157,510.

(60) Provisional application No. 62/636,527, filed on Feb. 28, 2018.

(51) Int. Cl.
    *G06F 7/00*     (2006.01)
    *G06F 16/25*    (2019.01)
    *G06F 16/22*    (2019.01)

(52) U.S. Cl.
    CPC .......... *G06F 16/258* (2019.01); *G06F 16/221* (2019.01)

(58) Field of Classification Search
CPC .. G06F 16/258; G06F 16/221; G06F 16/2282; G06F 16/9027; G06F 16/2455; G06F 16/2458; G06F 16/13; G06F 16/83; G06F 16/211; G06F 16/2393; G06F 16/38; H04L 67/1097; H04L 67/06; H04L 21/2353; H04L 21/8456; H04L 21/23439
See application file for complete search history.

(56) References Cited

U.S. PATENT DOCUMENTS

| | | | |
|---|---|---|---|
| 5,129,082 A | 7/1992 | Tirfing et al. | |
| 6,654,754 B1 | 11/2003 | Knauft et al. | |
| 6,804,682 B1 | 10/2004 | Kemper et al. | |
| 7,548,928 B1 | 6/2009 | Dean et al. | |

(Continued)

*Primary Examiner* — Mohammad A Sana
(74) *Attorney, Agent, or Firm* — PROCOPIO, CORY, HARGREAVES & SAVITCH LLP

(57) ABSTRACT

Disclosed are system and methods for processing and storing data files, using a data edge file format. The data edge file format separates information about what symbols are in a data file and information about the corresponding location of those symbols in the data file. Examples convert a source file comprising symbols into a data edge index having a manifest portion, a symbol portion, and a locality portion. The symbol portion contains a sorted unique set of symbols from the source file, and the locality portion contains a plurality of location values referencing the symbol portion. Examples include normalizing structured data from the source file by modifying the locality manifest portion of the data edge file to include a description of at least one nonexistent column empty locality value at a respective position within the locality file representing an omission of data at an associated position in the source file.

20 Claims, 14 Drawing Sheets

(56) References Cited

U.S. PATENT DOCUMENTS

| | | | |
|---|---|---|---|
| 8,234,350 B1 | 7/2012 | Gu et al. | |
| 11,157,510 B2* | 10/2021 | Hazel | G06F 16/13 |
| 2003/0033588 A1 | 2/2003 | Alexander | |
| 2003/0033594 A1 | 2/2003 | Bowen | |
| 2003/0105620 A1 | 6/2003 | Bowen | |
| 2004/0237036 A1 | 11/2004 | Qulst et al. | |
| 2005/0203876 A1 | 9/2005 | Cragun et al. | |
| 2005/0240352 A1 | 10/2005 | Liang | |
| 2007/0185914 A1 | 8/2007 | Prahlad et al. | |
| 2008/0077570 A1 | 3/2008 | Tang et al. | |
| 2010/0069035 A1 | 3/2010 | Johnson | |
| 2010/0070486 A1 | 3/2010 | Punaganti Venkata et al. | |
| 2010/0138442 A1 | 6/2010 | Shinkawa et al. | |
| 2010/0332456 A1 | 12/2010 | Prahlad et al. | |
| 2013/0007027 A1 | 1/2013 | Hazel et al. | |
| 2013/0159365 A1* | 6/2013 | Boctor | G06F 16/162 707/827 |
| 2013/0337789 A1 | 12/2013 | Johnson | |
| 2014/0279838 A1 | 9/2014 | Tsirogiannis et al. | |
| 2016/0196112 A1 | 7/2016 | Edwards et al. | |
| 2016/0253387 A1 | 9/2016 | Tidwell et al. | |
| 2017/0353516 A1* | 12/2017 | Gordon | H04N 21/2402 |
| 2018/0081939 A1 | 3/2018 | Hopeman et al. | |
| 2018/0089224 A1 | 3/2018 | Muthuswamy et al. | |
| 2018/0249226 A1 | 8/2018 | Strader et al. | |
| 2018/0338166 A1 | 11/2018 | Amiga et al. | |
| 2019/0064787 A1* | 2/2019 | Maturana | G05B 23/0294 |

* cited by examiner

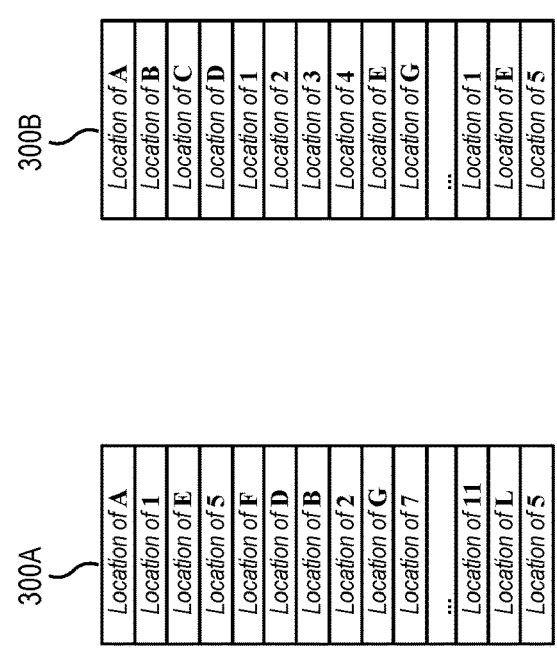
Fig. 3B
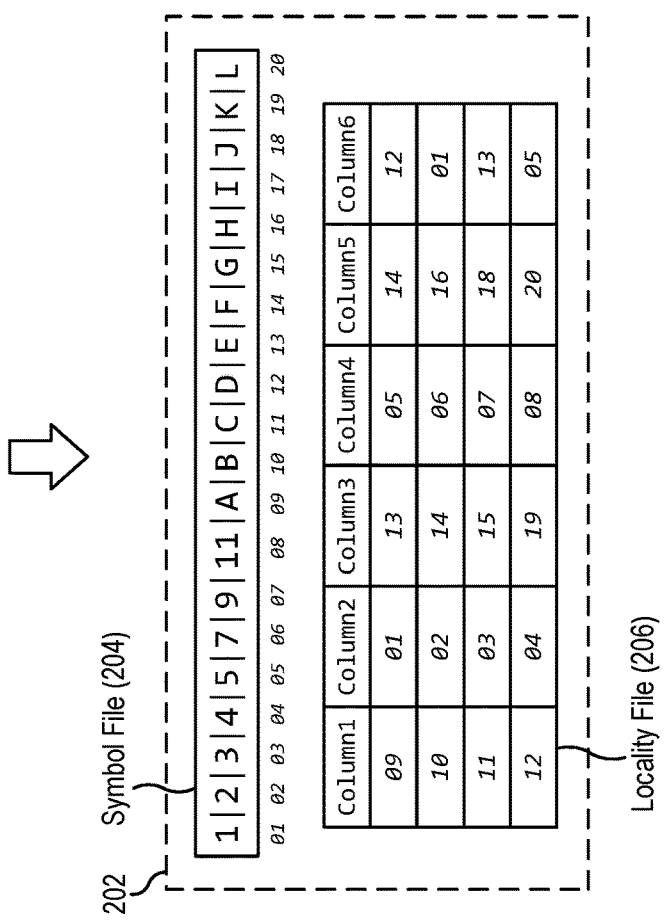
Fig. 3A
Fig. 2

DATA NORMALIZATION USING DATA EDGE PLATFORM

CROSS-REFERENCE TO RELATED APPLICATIONS

This application is a continuation of U.S. patent application Ser. No. 16/289,300, entitled "DATA NORMALIZATION USING DATA EDGE PLATFORM", filed on Feb. 28, 2019, and claims the benefit of U.S. Provisional Application No. 62/636,527, filed Feb. 28, 2018, which is incorporated by reference.

FIELD OF TECHNOLOGY

The present disclosure relates generally to the field of object storage and file compression, more specifically, to systems and methods for efficiently storing and analyzing files in object storage.

BACKGROUND

Object storage is a type of data storage architecture that manages data as objects, which has become popular due to its prevalence in cloud storage services. Object storage may be considered a form of a distributed key/value storage service, where keys (unique indexes) and values (opaque data) is accessed via PUT, GET, and LIST interfaces. Consequently, such data is copied out to do variety of processing and/or analysis, where the results of this external execution is often put right back into object storage. The cycle of Extracting, Transforming, and Loading (ETL) data is the crux of the data swamp problem, though not the only issue. The advantages of object storage is its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently this unstructured data is irregular, malformed, and chaotic, which is a direct result of object storage constructs.

Knowing what has been stored in object storage (e.g., "what's in your buckets") is another issue. In other words, understanding "what" to extract and "how" to extract it is a major step before any type of ETL operation can be performed. The ability to group information into "like" subsets is important to efficiently use object storage. However, once this information has been identified, the actual data analysis is yet another significant hurdle to overcome. Analysis of such disjoined, disparate, or malformed data traditionally requires either manual inspection via scaffolding such as via Hadoop™ (raw data) or manual transformation for analytic services such as Amazon Redshift™ (tabular data) and/or Elastic™ (text data). Whether manual inspection or transformation, each is time consuming, complicated, and costly; all contributing to the failures of "data lakes".

SUMMARY

Aspects presented herein provide a solution to these problems, enabling such functionality to be embedded directly into object storage; in essence, making object storage smarter and more capable. Aspects include a data format for universally representing any data source, with all its potential irregularities, e.g., everything from text based files such as Text, JSON, and CSV to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at the speed of classic analytic solutions. The data format not only does not increase the actual storage footprint, but may actually decrease it. The data format may be configured to intrinsically describe itself such that it can be exported into other data formats without unnecessary conversion. Aspects of the data format may be referred to herein as "data edge" or "data edging."

Data edging provides an ability to discover and organize data generically and concurrently, an ability to organize and represent data consistently and uniformly, and ability to compress and catalogue data to theoretical minimums, and an ability to query and analyze data without Extract, Transform, Load. Data Edging comprises a storage format where any processing algorithm can be applied to create, organize, and retrieve information.

Data edging involves separating the symbols of a file from the symbols' location within the file. Compression technology may then use the symbol and location of the symbol as part of its algorithm and representation. Among others, symbols within a file may be, e.g., words, images, numbers, data, and time types, etc. For example, a document may comprise words (e.g., symbols) placed at particular locations (e.g., "locality") in a source file that should be reconstituted in a lossless approach. By separating the symbols and locations of the symbols, one can organize and compress data to its optimal state; mixing the two limits what any given compression algorithm can achieve. Symbols and locality of the symbols are not "like" entities and thus cannot be reduced easily. The data edge format also includes a descriptive "manifest" incorporated into the indexed data source that is used to map together interrelated symbol and locality segments, as well as provide descriptive indicators of how the underlying data is transformed or normalized into a data edge index.

According to one aspect of the present disclosure, a method of storing a file in object storage is provided. The method includes receiving, from an object storage, a source file having data comprising at least one of structured data and semi-structured data. The method further includes converting the source file into a data edge file having a manifest portion, a symbol portion, and a locality portion. The symbol portion contains a sorted unique set of the symbols from the source file, and the locality portion contains a plurality of location values referencing the symbol portion. The method includes normalizing the data from the source file by modifying the manifest portion of the data edge file to include a description of at least one nonexistent column representing an omission of data at an associated position in the source file.

In another exemplary aspect, a computer apparatus for storing a file in object storage is provided. The computer apparatus includes memory, and at least one processor coupled to the memory. The processor is configured to receive, from an object storage, a source file having data comprising at least one of structured data and semi-structured data. The processor is further configured to convert the source file into a data edge file having a manifest portion, a symbol portion, and a locality portion. The symbol portion contains a sorted unique set of the symbols from the source file, and the locality portion contains a plurality of location values referencing the symbol portion. The processor is then configured to normalize the data from the source file by modifying the manifest portion of the data edge file to include a description of at least one nonexistent column representing an omission of data at an associated position in the source file.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a block diagram depicting a structured data source file and a corresponding converted data edge file according to an exemplary aspect.

FIGS. 3A and 3B depicts representations of a locality file in row-based and column-based orientations according to an exemplary aspect.

DETAILED DESCRIPTION

Exemplary aspects are described herein in the context of a system, method, and computer program product for processing and analyzing data stored in object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
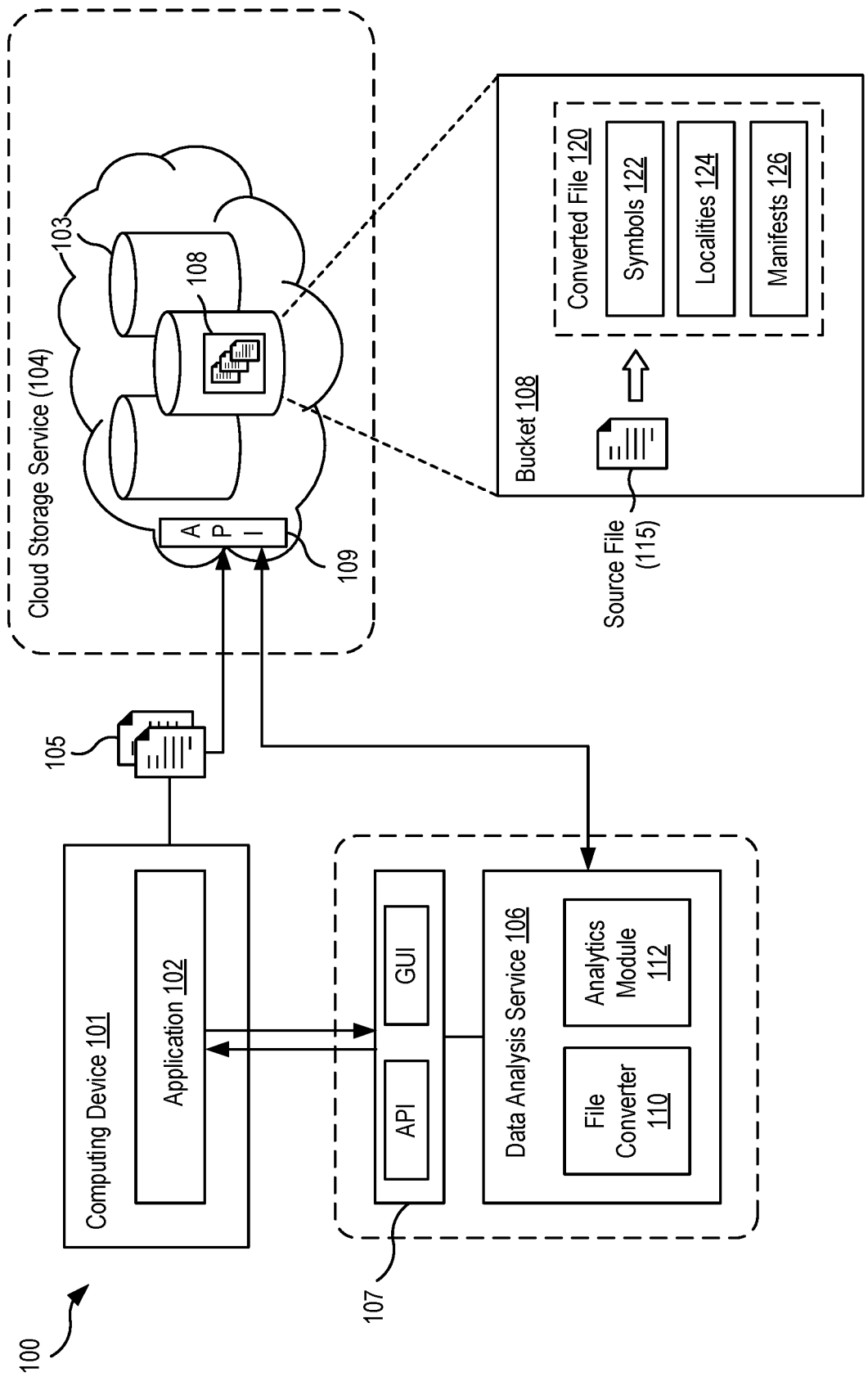
FIG. 1 is a block diagram illustrating a system for processing and analyzing data stored in object storage according to an exemplary aspect.

FIG. 1 is a block diagram illustrating a system 100 for processing and analyzing data stored in object storage according to an exemplary aspect. The system 100 includes a computing device 101 executing an application 102 that is configured to store data 105 in an object storage system 103. In the aspect shown, the object storage system 103 may be provided by a cloud storage service 104. In one example, the application 102 may have a multi-tier software architecture in which user data of the application is stored in a data layer is stored in the object storage 103. The application 102 may be configured to store, retrieve, modify, and/or access data in the object storage system 103 via an application programming interface 109 (API), REST-based interface (e.g., using PUT, GET, LIST operations), or other interfaces exposed by the cloud storage service 104.

The object storage system 103 (also referred to as object-based storage) may include one or more storage devices configured to provide a data storage architecture that manages data 105 as objects, in contrast to a filesystem-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 103 is configured to store units of data 105 as "objects" (also referred to as "blobs" in some architectures), and maps each object to a unique identifier (e.g., key, index, object name). For clarity of explanation, the data 105 stored in object storage is interchangeably referred to as "files" in the present disclosure. The object storage system 103 may have a flat hierarchy and include a plurality of buckets 108, which are logical containers for holding the data 105. That is, each object is stored in a particular bucket 108.

The data stored in the object storage system 103 may represent one or more computer files having a variety of file formats and types of data, including text data, binary data, log files, program data files, CSV (comma-separated values) files, XML files, JSON (JavaScript Object Notation) files, image files, audio files, and video files. The data 105 in object storage may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, an application 102 may store an amorphous mix (structured data, semi-structured data, and unstructured data) of bulk data in the object storage system 103, resulting in data being stored in a disjointed, disparate, and schemeless manner. As described earlier, buckets 108 might only expose structure by virtue of keys and their associated object or blob. As such, from the point of view of a user, the objects stored in the object storage system 103 may conform to some unspecified structure that is unknown, unless a user downloads and manually inspects them (e.g., and determine the file is a csv or log file).

According to aspects of the present disclosure, the system 100 includes a data analysis service 106 configured to process and analyze the data 105 stored in the object storage system 103. As described in greater detail below, the data analysis service 106 includes a file converter module 110 configured to convert data in object storage to a specialized file format, referred to herein as a "data edge" file format (interchangeably referred to as "data edging"), that enables the data analysis service 106 to discover, refine, and query the object storage data. The data-edge file format further allows improved compression of the data stored in object storage based on the separation of symbols from their location. The data-edge file format models data sources in an edge space representation, of which can be analyzed via complex mathematical algorithms, such as linear algebra computation.

The data analysis service 106 further includes an analytics module 112 configured to analyze one or more data edge file(s) 120 and generate statistical information (manifest 126) based on the data contained in the data edge files 120. The data analytics module 112 may be configured to perform "in-place" normalization, aggregation, and correlation in which the statistics and manipulation of the data source is within the storage layer itself (i.e., object storage). The data analytics module 112 may be configured to perform relevant cleansing and preparation functionality by manipulating data edge files' locality file(s) in object storage. This is performed with less memory, at larger scale, and with greater speed than existing tooling, which can often uses separate data warehousing to perform ETL and analysis.

In one aspect, the data analytics module 112 may be configured to collect statistics related to the data in the data edge files, and use these statistics to both "fill in" or "remove" irregular shapes in response to a user request received from the interface 107 (e.g., API or GUI) or in an automated manner. The data analytics module 112 may manipulate the data edge locality to normalize data sets based on analytics needs by performing one or more of the following functions: insert row or column; delete row or column; copy row or column; merge row or column; update symbol for cell (i.e., field); extract symbol from cell (i.e., field); split row/column matrix; join row/column matrix; provide stats (function) of column. In one implementation, these functions can be driven by a REST based API (e.g., interface 107) that can be driven from a command line interface and at scale. The REST based API can be access via any programming language. In some implementations, for example, the normalization operations may be specified using functional or scripting language, such as "for Column 6, fill empty slots with the median value of that column". In other implementations, the normalization operations may be specified interactively using a GUI.

In some aspects, the data analysis service 106 may be configured to process files already stored in object storage, for example, all files contained in a selected bucket 108. In other aspects, the application 102 may store data 105 in object storage using the data analysis service 106 as an intermediary, which in turn converts the data 105 into data edge files stored in object storage.

In one implementation, the data analysis service 106 may be a distributed server application executing on one or more computing devices (not shown). The data analysis service 106 may include an interface 107 that enables the application 102 to discover, refine, and query the data 105 it has stored within its buckets in object storage. In some aspects, the interface 107 may be an API of the data analysis service 106 configured to provide the application 102 programmatic access to the functionality of the data analysis service 106 in relation to the data 105. In one aspect, the API of the data analysis service 106 may be configured to extend or override (i.e., "wrap") the API interface provided by the cloud storage service 104. In other aspects, the interface 107 of the data analysis service 106 may be a command-line or graphical user interface (GUI) of server-based application that enables a user to interactively discover, refine, and query the data 105 stored within object storage.

The data analysis service 106 may process data 105 in object storage in a manner that separates the symbols of a file from their location in the file. In one aspect, the data analysis service 106 may be configured to, given a source file 115 of data, generate a converted file 120 organized into: (1) a symbol portion 122 containing the symbols of the source file 115, and (2) a locality portion 124 containing values representing the respective locations of those symbols in the original source file 115. In some aspects, the data analysis service 106 may create two files from the source file 115: a symbol file (e.g., "filename.I2S", containing the symbol portion 122) and a locality file (e.g., "filename.L2I", containing the locality portion 124). In some implementations, the symbol file and the locality file may be concatenated into one file (e.g., after it is compressed), and in other cases, the symbol file and locality file may be maintained separately. In some aspects, the converted file 120 may further include a manifest portion (e.g., "filename.MDS") that contains metrics, statistics, and other metadata related to the original data source 105, to the data edge file, and to the conversion process performed.

Data compression techniques generally involve encoding some data using fewer bits than its original representation by finding patterns and eliminating redundancy. Consider the simple example of a data source file containing one hundred symbols, in which all symbols are the word "cat". A compressed version of this file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million, could be represented as "1ToMillion," with a saving factor of 6 times. It has been determined that as the source file gets larger, it becomes more difficult for a compression algorithm to find common or redundant patterns. Accordingly, the format of the data edge file is configured to organize symbols in a manner that facilitates more efficient data compression.

The following discussion provides detailed examples of converting source files of a variety of data types, including structured data (FIG. 2) such as CSV files, unstructured data (FIG. 4) such as text data, and structured data with text values (FIG. 5), and semi-structured data (FIGS. 10A and 10B) such as JSON and XML, files. Aspects of the present disclosure further provide examples of normalizing data sources with irregular fills (FIGS. 6A to 6C) and irregular removals (FIG. 7).

FIG. 2 is a block diagram depicting a structured data source file 200 and a corresponding converted data edge file 202 according to an exemplary aspect. The source file 200 contains structured data having a plurality of records organized into rows and columns. For example, the source file contains values having symbols (e.g., "A", "1", "E", "5", "F", "D", etc.) arranged in a 4-row by 6-column table format (the row containing column names "Column1", "Column2", etc. is omitted from this discussion). The structured source file 200 is rendered in FIG. 2 in a table format for sake of illustration, but it is understood that the structured data may be encoded in a variety of formats. For example, the source file 200 may be a delimiter-separated file (such as a CSV file) containing a plurality of records (i.e., lines), where each record is comprised fields separated by a delimiter (e.g., comma). In another aspect, the structured source file 200 may be a log file containing a plurality of log entries, e.g., separated by a tab or whitespace character.

The file converter 110 may create a symbol file 204 associated with the source file that contains each unique symbol found in the source file 200. The file converter 110 may perform initial reduction of the source file 200. That is, the file converter 110 finds duplications and removes them, and finds sequences and orders them. In one aspect, the file converter 110 may scan through the file, identifying each unique symbol contained in the source file, order them, and disregard any duplicate symbols encountered. For example, the file converter 110 may identify that the source file 200 contains a duplicate symbol "5" in both the first row, fourth column, as well as the fourth row, sixth column (highlighted by dashed circles). In this case, the file converter 110 only includes a single instance of the symbol "5" in the resulting symbol file 204.

In some aspects, the file converter 110 may represent symbols as "Strings" type. In some cases, it may be more efficient to convert one or more symbols from the source file into a different data type, such as a number or time period (i.e., date/time). These constructs of String, Number, and Time Period allows the data analysis service to order symbols with greater efficiency. Ordering the numbers as strings can produce a different result than using the actual number under alphanumeric ordering. For example, the numerical symbols shown in symbol file 204 are sorted as numbers (1, 2, 3 . . . , 9, 11), rather than as strings, which would produce (1, 11, 2, 3 . . . ).

In one aspect, once the symbols have been reduced and organized, the symbols may be concatenated with a delimiter. In the example shown, the symbols in the symbol file 204 are separated by a vertical bar or pipe character "|". The symbol delimiter may be unique in the context of the symbols, and may also be reduced during the compression operation. In some aspects, each symbol in the symbol file 204 as well as localities in the locality file 206 may be represented in binary format (i.e., as 0 and 1) for improved compression.

The file converter 110 may generate a locality file 206 containing each location of each symbol. The locality file 206 represents the structure of the modeled source (e.g., raw data source). The present disclosure uses the term "position" to refer to a locality within the source file (and the mirrored localities in the locality file), distinguished from the term "location" which is used to refer to a locality or coordinates within the symbol file. If a symbol is in the source file 200 more than once, a new value (representing a symbol location) is added. As shown in FIG. 2, each symbol in the symbol file 204 has a corresponding location (within the symbol file). For example, the symbol "1" is located at location "01"; the symbol "A", at location "09"; and the symbol "L" at location "20" of the symbol file. The position (within the locality file) of a location value is mirror of the raw source file 200. In other words, the locality file 206 may be similar to the source file 200 except that in place of the actual symbol, the locality file 206 has a value representing the location of a particular symbol within the symbol file 204.

For example, in the first row, first column, the locality file has a location value "09" in place of the symbol "A" found in the corresponding position in the source file. In another example, in the first row, third column, the locality file has a location value "13" in place of the "E" symbol found in corresponding spot in the source file. In yet another example, the locality file contains two instances of the location value "05" to represent the two separate occurrences of the symbol "5" in the source file 200.

In one aspect, a location value may be implemented as an integer value that is a simple index or offset relative to the symbol file. For example, a location value "01" represents a first-ordered position in the symbol file. In other aspects, a location value may be coordinate values (e.g., x-y) of a symbol within structured data. In yet other aspect, a location value may be an address of a symbol contained with the symbol file. In some aspects, the location values may be fixed in size (i.e., expanded by adding prefix 0's), and also represented in binary (0s and 1s). The fixed size may allow for a more efficient processing protocol because fixed size fields may have a reduced overhead. In other words, simplified math may be used to find a given symbol in a data source file.

According to an aspect, the converted file format comprised of a symbol file and a locality file may be configured to support lossless compression. That is, the original source file can be recreated from the encoding in the data edge file. For example, to reproduce the original data source, the locality file can be scanned, each location value is used as a lookup index in the symbol file, and the location value is replaced with the retrieved symbol.

As described above, in some aspects, the compression algorithms may have some difficulty finding patterns when the distance of those patterns is large or disjoined. As a result, the localities in the locality file may be ordered by a row or column orientation, as shown in FIGS. 3A and 3B, respectively, or even by diagonal orientation. FIG. 3A depicts one representation of a locality file 300A in a row-based orientation, having the locations of symbols in the first row, sequentially, followed by the locations of symbols in the second row, and so forth. In these figures and in Figures to follow, the location value is represented in generic terms such as "Location of A", for clarity of illustration. FIG. 3B depicts a representation of a locality file 300B in a column-based orientation, having the location values of symbols from the first column of the source file, sequentially, followed by the location values of symbols from the second column of the source file, and so forth.

Figure 4:
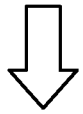
FIG. 4 is a block diagram depicting a conversion of an unstructured data source file to a data edge file according to an exemplary aspect.

FIG. 4 is a block diagram depicting a conversion of an unstructured data source file 400 to a data edge file 402 according to an exemplary aspect. The source file 400 may be a document file having a plurality of text data, such as in plain text files (.txt), rich text format (.rtf), and other document file formats. As used herein, "text data" is a generalized, superset term for a data source that contains a plurality of Strings, and may also contain any combination of plain (not binary) symbols such as Strings, Numbers, Dates, etc. In the example shown, the source file 400 includes a text sentence:

I propose to consider the question, 'Can machines think?' By Alan Turing.

In one aspect, the data edge format may represent text sources as a continuous stream of data (i.e., left-to-right, up-to-down). It can be seen as a one-dimensional array, where numbers and words are symbols, and (most) special characters are symbols as well (i.e., one column of rows of symbols). Classical text separators, such as spaces, line breaks, tabs, and other whitespace characters, may be used as symbol delimiters. The block 401 depicts a tokenized intermediate version of the text source 400 in which the symbols have been separated by the delimiters.

In one aspect, the file converter 110 may generate a symbol file and locality file in a manner similar to the technique described earlier with regards to structured data. The file converter 110 may create a symbol file 404 associated with the source file that contains each unique symbol found in the source file 400 in a sorted order (e.g., the symbols "Alan", "By", "Can", "I", "Turing", "consider", "machines", "propose", "question", etc., as well as punctuation symbols). The file converter can discard or disregard duplicate symbols (such as the second occurrence of the comma symbol ","). In the end, the symbol file 404 is a sorted array of delimited characters, and the locality file provides the location of those characters in the raw data source (similar to the format of the locality file described earlier). In some cases, this representation may be the most optimal from the standpoint of compression.

Alternatively, the data analysis service 106 may use another mode of representation that allows for unique and optimal text query execution. Since text files are generally smaller than machine-generated files (such as CSV, log files, JSON, and XML, data sources), and classic text indexing technology dramatically increases the storage of raw text, this alternative mode of representation is still significantly smaller than conventional text indexing technology, such as an inverted index, as made available in the Apache Lucene software library.

As shown in FIG. 4, in one aspect, the file converter 110 may generate a locality file 406 where the locality is not the coordinates (x,y) of the location of the corresponding symbol in the source file, but rather a fingerprint value (e.g., hash) of the symbol itself. The position of a hash value within the locality file 406 represents the position of the corresponding symbol in the raw text source file 400. For example, the position of the hash value for the symbol "consider" in a fourth position of the locality file 406 indicates that the symbol "consider" is found in a fourth position of the original data file. This variation of representing the locality file enables the locality file to be used for text-based search without needed to refer to the symbol file. If the locality file contains hashes of symbols (rather than their coordinates), then a symbol lookup need only analyze the locality file.

According to aspects, the mapping of hash-to-symbol can be inferred since reproduction of raw source is available by hashing symbols. Lossless compression is still supported in this variant aspect. The original raw source can be recreated by hashing the symbols in the symbol file, and with these hashes, reproducing the structure of the source by matching the hashes in the locality file. The advantage of this is now the locality file 406 no longer needs to reference the symbol file 404 to answer text query operations regarding the text data. Additionally, since locality files are matrices of number, high performance multidimensional mathematical libraries (e.g., linear algebra operations) can be used, as well as, simple and fast bitwise operations (e.g., bit map operations). For instance, the data analysis service 106 may take a symbol or phrase of symbols, convert them into hash values, and then searched/positioned into these matrices.

In one implementation, the file converter 110 use a hash algorithm, such as MetroHash, to generate the fingerprint value corresponding to each symbol identified in the source file 400. In some implementations, the fingerprint value may have a size of 64 bits or more to reduce the likelihood of hash collisions. In some aspects, the data analysis service 106 may further maintain a hash lookup table (e.g. hash to count) to reduce the size of locality files. It should also be noted that all languages can be represented in the data-edge file format. In other words, the outlined directional flow of data edge files is an internal representation and has no adverse effects with respects to reproduction and/or symbol search/position.

For well-formed structured data sources (e.g., CSV) that are of basic data types (e.g. Boolean, number, string), a 2-dimensional locality model may suffice (see FIG. 2 above). However, as data sources become more complex, additional dimensions are added. For instance, the data-edge file format models text column sources as a new dimension per each row. The reason is that each text row column can have a different format and shape, even though conceptually it is perceived as the same column. Text data may be thought of an array type of symbols, and when part of a complex data source, have their own story, and deserve its own dimensionality. In other words, the change of shape introduces a new dimension. And yet, the representation of dimensions, both in memory and on disk, is a one dimensional array, partitioned into n-number of dimensions.

One can view each one of these dimensions as a vector space, where a vector is a directional sequence of points. Thus, a locality is a data point, as part of a vector, describing a data source structure. And to reiterate, locality is what models the format and shape of a data source. Symbols, on the other hand, have no relationship to a data source's format and shape. Symbols are typically represented as one-dimensional. However, dimensions can be introduced based on the type of symbol (e.g., Booleans, numbers, strings, and dates are all different vectors).

Figure 5:
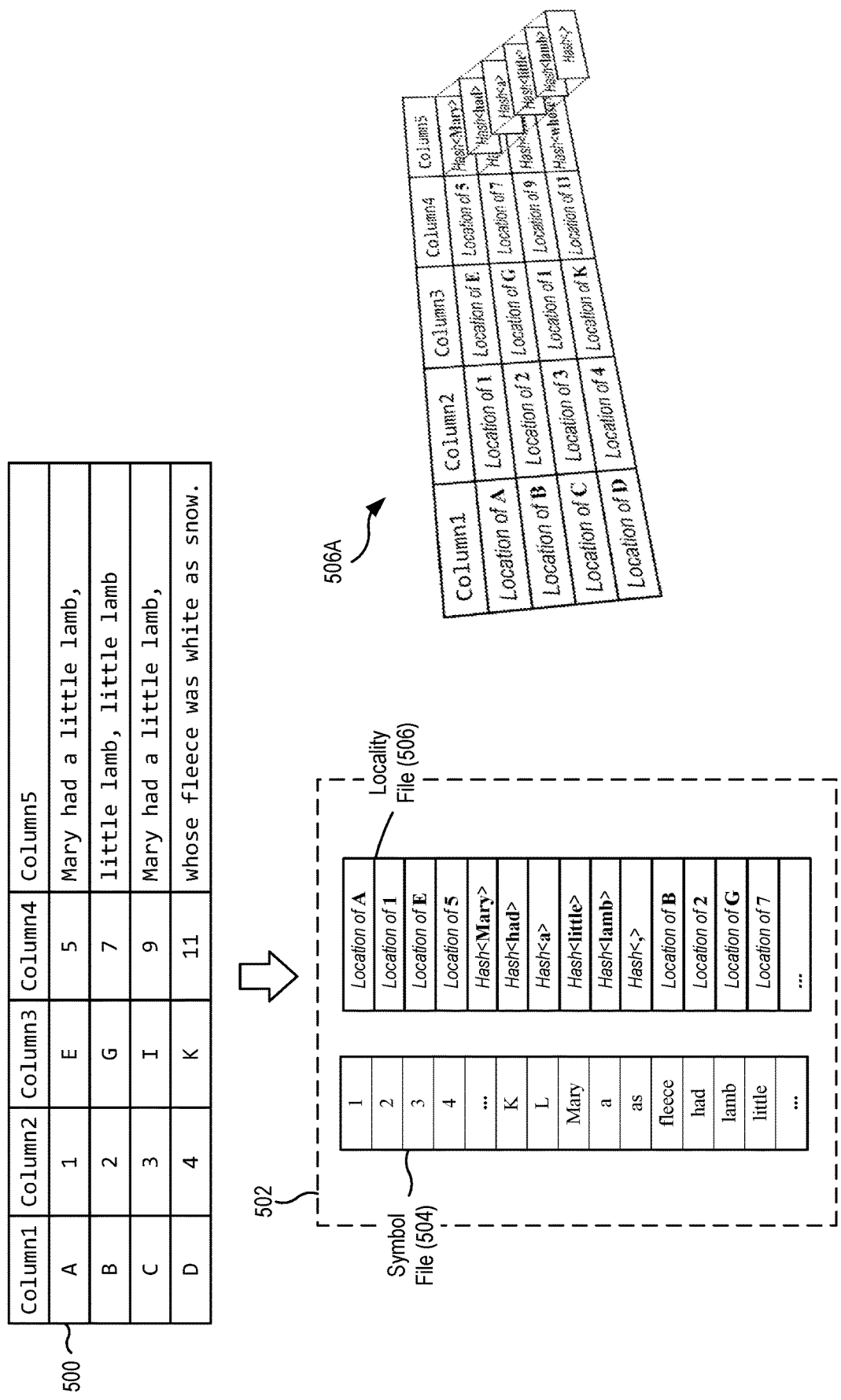
FIG. 5 is a block diagram depicting a conversion of a structured data source file having text data to a data edge file according to an exemplary aspect.

FIG. 5 is a block diagram depicting a conversion of a structured data source file 500 having text data to a data edge file 502 according to an exemplary aspect. The source file 500 is similar to the example structured data source file 200, except that for the presence of a column of text data (i.e., "Column5"). In contrast to the other columns of data having simple data types (e.g., "A", "1", "E", "5"), the text column includes sequences of text (e.g., "Mary had a little lamb").

The data edge file 502 for the structured data source file 500 having a text column may include a symbol file 504 and a locality file 506. The file converter 110 may create the symbol file 504 associated with the source file that contains each unique symbol found in the source file 500 in a sorted order. As shown, this includes symbols of the basic data types found in the columns 1-4 (e.g., "A", "1", "E", "5"), as well as symbols parsed in the text column (e.g., "Mary", "a", "as", "fleece", "had").

The file converter 110 may further create the locality file 506 having a combination of location values indicating the location of each symbol in the symbol file 504, as well as fingerprint values of symbols from the text column. The positions of the location and hash values are mirrors of the raw data source 500. For example, the locality file 506 contains, at a first position of the locality file itself, a location value (depicted generically as "Location of A") representing where the corresponding symbol "A" can be found in the symbol file 504. In a further example, the locality file 506 also contains a plurality of hash values for symbols of text data at a position within the locality file 506 corresponding to Column5. The locality file 506 for a structured data source may be modeled as two-dimensional structure corresponding to the rows and columns of the structured data source, with the addition of a third dimension corresponding to a sequence of text data found in at least one of the cells. In other words, a CSV can be a two-dimensional matrix where the text column can be viewed as a third dimension starting at the location of the row and column coordinates. This three-dimensional concept is depicted in the form of the locality file 506A shown in FIG. 5.

In one aspect, the data analysis service 106 may be configured to convert and analyze log files, which may have file types with predetermined formats or formats that are dynamically determined at time of parsing. For example, all log types may be read via pre-determined or user-specified regular expressions (i.e. REGEX) to parse the structure of the respective data sources. In one aspect, the data analysis service 106 may determine that some data sources are log files for network traffic handled by load balancers, formatted according to an Elastic Load Balancing (ELB) log file format, which are log files published for load balancer nodes provided by an Amazon Web Service® (AWS). The file converter 110 may apply one or more regular expressions to both the filename of the ELB log file (which can be formatted in a particular manner with metadata) and to each line within the ELB log file (representing an access request handled by a load balancer node) to extract fields such as a timestamp, a name of the load balancer, an IP address and port of the requesting client and of the backend instance that processed the request, a request processing time, a backend processing time, a status code from the load balancer, a backend status code, a size of the request (in bytes), a size of the response (in bytes), a copy of the request line from the client, a user-agent string of the requesting client, and SSL-related information. As shown, in the case of log-file data sources, there is typically an underlying structure for each line of log records. In other words, log files are similar to CSV files where this said structure is the delimitation. As a result, data edged representation of log files can be treated similarly to the aspects described in conjunction with CSV files. When there is a line that has no discernible structure (i.e. like delimitation to other lines), these symbols can be view as text. And like CSV with text, the data edging follows a similar process for representation.

Figure 10A:
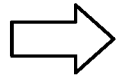
FIGS. 10A and 10B are block diagrams depicting a conversion of a semi-structured data source file to a data edge file according to an exemplary aspect.

The conversion of semi-structured data sources (e.g., JSON and XML) into a data edge file may follow all the same principles that have discussed earlier for unstructured data sources (e.g., Text) and structured data sources (e.g., CSV, log data sources) and their combinations thereof. FIG. 10A is a block diagram depicting a conversion of a semi-structured data source file 1000 to a data edge file according to an exemplary aspect. The example source file 1000 is a JSON file having data in the form of a plurality of name-value pairs that describe an entity (e.g., "Company X"). In the example shown, the JSON data includes data specifying a name field, an address field, and an employees field (which contains an array of employee names).

In one aspect, the semi-structured data source 1000 may be transformed into a two-dimensional representation. First, the file converter 110 may generate a flattened representation 1001 of the semi-structured data. In one aspect, the flattened representation 1001 may include a plurality of columns corresponding to the keys of the JSON object, and a row of data corresponding to values of the JSON object. In the example shown, the "name" field is transformed into a first "name" column. The "address" object is transformed into separate columns, each column representing a name-value pair in the address object (e.g., "address.street", "address.city", "address.state"). The "employees" array is transformed into separate columns, each column for each element in the array (e.g., "employees[0]", "employees[1]", "employees[2]").

After generating this two dimensional structure 1001, the file converter may proceed to generate a symbol file and a locality file associated with the semi-structured data source 1000. Similar to the earlier examples, the file converter 110 may create a symbol file associated with the semi-structured source file that contains each unique symbol found in the value data of the name-value pairs of the semi-structured data, in a sorted order. The file converter 110 may further create a locality file containing the location values of the symbols in the symbol file.

Figure 10B:
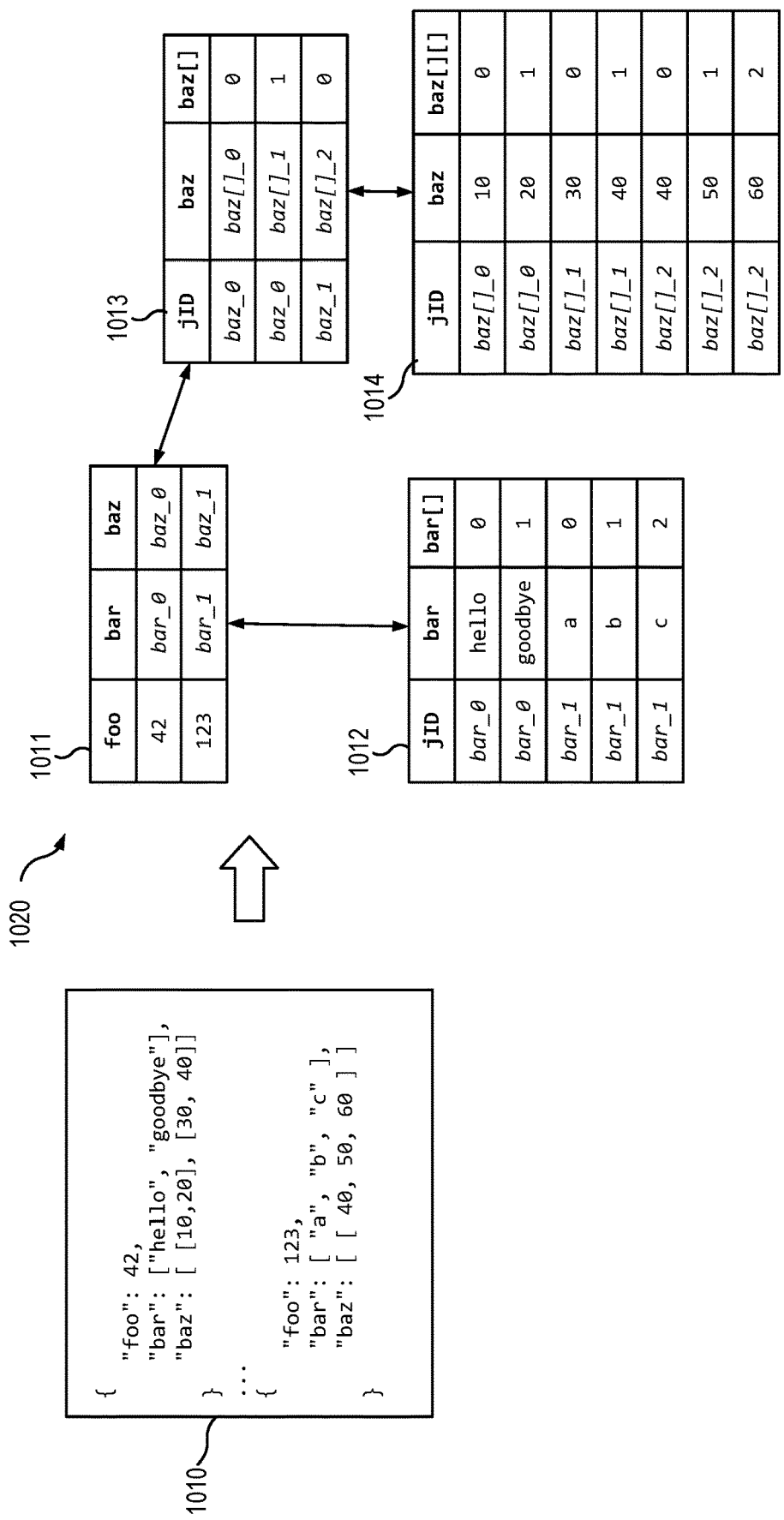

FIG. 10B depicts another example conversion of semi-structured data source 1010 to a data edge file according to an exemplary aspect. The example source file 1010 is a JSON file having data in the form of a plurality of attribute-value pairs and array data types. The following is an illustration of how the data edge system "collapses" or "normalizes" the data explosion issue of flattening multidimensional JSON data sources. The general concept is to "not" build out all permutations of representation into a 2-dimensional matrix (as shown in FIG. 10A), but rather model the JSON (in a data edge format) with sufficient information to reconstitute the original structure and dynamically materialize this 2D matrix to support all analytical operations (i.e., search/query) via internal data edge self-joining columns prior to. Consider the below two example records.

```
{
  "foo": 42,
  "bar": ["hello", "goodbye"],
  "baz": [ [10,20], [30, 40]]
}
...
{
  "foo": 123,
  "bar": [ "a", "b", "c" ],
  "baz": [ [ 40, 50, 60 ] ]
}
```

These structures could be represented in a flattened way such that they contain sufficient information to reconstitute the original structure of the data:

TABLE 1

Flattened Representation of JSON Data

| foo | bar | bar[ ] | baz | baz[ ] | baz[ ][ ] |
|---|---|---|---|---|---|
| 42 | hello | 0 | 10 | 0 | 0 |
| 42 | hello | 0 | 20 | 0 | 1 |
| 42 | hello | 0 | 30 | 1 | 0 |
| 42 | hello | 0 | 40 | 1 | 1 |

TABLE 1-continued

Flattened Representation of JSON Data

| foo | bar | bar[ ] | baz | baz[ ] | baz[ ][ ] |
|---|---|---|---|---|---|
| 42 | goodbye | 1 | 10 | 0 | 0 |
| 42 | goodbye | 1 | 20 | 0 | 1 |
| 42 | goodbye | 1 | 30 | 1 | 0 |
| 42 | goodbye | 1 | 40 | 1 | 1 |
| 123 | a | 0 | 40 | 0 | 0 |
| 123 | a | 0 | 50 | 0 | 1 |
| 123 | a | 0 | 60 | 0 | 2 |
| 123 | b | 0 | 40 | 0 | 0 |
| 123 | b | 0 | 50 | 0 | 1 |
| 123 | b | 0 | 60 | 0 | 2 |
| 123 | c | 0 | 40 | 0 | 0 |
| 123 | c | 0 | 50 | 0 | 1 |
| 123 | c | 0 | 60 | 0 | 2 |

However, since flattening the data this way can grow the data (and the space needed to store the data) exponentially, it has been determined that the improved method for storing the nested data is separately, so that the data can be joined in as needed. In one aspect, as shown in FIG. 10B, the semi-structured data source 1010 may be transformed into a flattened representation 1020 spanning a plurality of tables or data segments 1011, 1012, 1013, 1014, each having a plurality of columns corresponding to the attributes/keys of the JSON object, and a row of data corresponding to values of the JSON object. In certain cells, rather than correspond to values of the JSON object, the values of particular cells contain an identifier or reference corresponding to an array data type. The general idea is that any time the file converter encounters an array (while processing a data source), the file converter assigns the array a new opaque value and then remodels its structure in a separate logical table (though, this can still be part of the same physical table if desired—the table would simply be sparse). If a nested array is encountered, the file converter can apply the same principle of operation. In this way, it is possible to avoid "row explosion" in the case that not all the data is needed to be joined in to service a particular query.

For example, the file converter 110 may iterate through the semi-structured data source 1010, and each record processed forms each row in a first-level segment 1011. As shown, the attribute-value pairs of the each record ("foo", "bar", "baz") form the columns of the first-level segment 1011. When the file converter 110 encounters an array data type corresponding to the first "bar" attribute, the file converter assigns this array a new reference value or identifier (e.g., "bar_0") and restructures the values of the array into a separate second-level segment 1012. The separate data segment 1012 includes a plurality of columns including a join identifier (jID) that corresponds to the reference value of the array, and rows of data corresponding to the attribute-value pairs found in the array. That is, rows of data having the same join ID (e.g., "bar_0") in the data segment 1012 represent values (e.g., "hello", "goodbye") in the same array of the original data source. Similarly, in response to determining a row contains a nested array, the file converter 110 applies the same approach and restructures the values of the array into a next level of data segment. For example, when the file converter encounters the attribute-value pair "'baz': [[10,20], [30, 40]]", a second-level data segment 1013 and a third-level data segment 1014 are created as shown.

In some aspects, the file converter may generate a pair of locality and symbol segments for each data segment 1011, 1012, 1013, 1014 that are linked together using self-joins specified by a corresponding manifest. The following rows encode the flattened representation:
{"foo": 42, "bar.id": "bar_0", "baz.id": "baz_0"}
{"foo": 123, "bar.id": "bar_1", "baz.id": "baz_1"}
{"jid": "bar_0", "bar": "hello", "bar[ ]": 0}
{"jid": "bar_0", "bar": "goodbye", "bar[ ]": 1}
{"jid": "bar_1", "bar": "a", "bar[ ]": 0}
{"jid": "bar_1", "bar": "b", "bar[ ]": 1}
{"jid": "bar_1", "bar": "c", "bar[ ]": 2}
{"jid": "baz_0", "baz[ ].id": "baz[ ]_0", "baz[ ]": 0}
{"jid": "baz_0", "baz[ ].id": "baz[ ]_1", "baz[ ]": 1}
{"jid": "baz_1", "baz[ ].id": "baz[ ]_2", "baz[ ]": 0}
{"jid": "baz[ ]_0", "baz": 10, "baz[ ][ ]": 0}
{"jid": "baz[ ]_0", "baz": 20, "baz[ ][ ]": 1}
{"jid": "baz[ ]_1", "baz": 30, "baz[ ][ ]": 0}
{"jid": "baz[ ]_1", "baz": 40, "baz[ ][ ]": 1}
{"jid": "baz[ ]_2", "baz": 40, "baz[ ][ ]": 0}
{"jid": "baz[ ]_2", "baz": 50, "baz[ ][ ]": 1}
{"jid": "baz[ ]_2", "baz": 60, "baz[ ][ ]": 2}
with the following self-joins:
JOIN "bar.id"="jid" COLUMNS=["bar", "bar[ ]"]
JOIN "baz.id"="jid" COLUMNS=["baz[ ]"]
JOIN "baz[ ].id"="jid" COLUMNS=["baz", "baz[ ][ ]"]

It should be noted that both JSON and XML (by definition) cannot be malformed and would be considered invalid. These data sources are described as semi-structured. In the case of processing an invalid JSON/XML data source, the file converter 110 will model it as a one dimensional text array and can be considered unstructured (i.e. a list vector of directional symbols).

In another aspect, the data edge representation of complex structures such as JSON and XML is simply an extension of the same multidimensional description, constructs, and rules as discussed earlier. For instance, JSON can be viewed as a human readable data format and can be viewed as an object, but without the methods. In other words, these structure can model Booleans, numbers, strings, arrays, and maps (i.e. objects), as well as, any combination thereof.

In one aspect, in the case of log-file data sources, there is typically an underlying structure for each line of log records. In other words, log files are similar to CSV files where this said structure is the delimitation. As a result, data edged representation of log files can be treated similarly to the aspects described in conjunction with CSV files. When there is a line that has no discernible structure (i.e. like delimitation to other lines), these symbols can be view as text. And like CSV with text, the data edging follows an identical process for representation.

It should be noted that most, if not all, relational analytic databases do not support text types or text search, nor does text search database support true relational operations. The support of both relational and text queries by aspects of the present disclosure, in one technology, has significant benefits both from a cost and complexity perspective.

Using the data edge file format, the file converter 110 can model these types and combinations. Types such as basic types (e.g. Boolean, number, string, and date) are identified as symbols, with each having a locality of reference. An array of types is the same construction like the Data Edge text (symbols) based one dimensional array. A map is a symbol to another dimension that can be another symbol, list, and/or map. In the case of a map, the locality is a special locality that references the symbol and another locality of reference.

It should be noted that most, if not all, relational analytic databases do not support text types or text search, nor does text search database support true relational operations. The supporting of both relational and text queries by aspects of the present disclosure, in one technology, has significant benefits both from a cost and complexity perspective.

Another aspect of the reduction is that the data edge format provides the ability to partition data into manageable chunks, but logically operate on them as a whole. Data edge can work on data sources having a size greater than the available memory by slicing and then link/merging them into separate but connected physical representations. It should be noted that link/merging de-duplicates information across each chunk such that optimal compression is achieved across the entire data source. It should be noted that the present description is in the context of one complete representation, rather than data sources chunked-up for parallel execution, as well as, the corresponding link/merging of individual chunks. None of the representations changes at scale, just the process of "connecting" them together via the link/merge operation.

Normalization

Normalization generally refers to a process of reorganizing or modifying data to eliminate redundant data and minimize anomalies (e.g., conventionally, of data within a relational database). One of the main purposes of normalizing data is to make the data sources ready for in-depth analysis, which is based on relational operations or mathematical operations, such as linear algebra and matrix math. Generally, data sources are normalized into matrices from 1 to N dimensions, and are particularly important in machine learning, deep learning, and artificial intelligence use-cases.

In many approaches, the goal of any data normalization process is to make a raw data source symmetrical both in shape and in content. For instance, a source file may be a CSV data file that is irregular (e.g., missing columns in certain rows) or malformed. One option for handling this data would be to simply ignore any rows that do not match an average column count. However, for some rows, it may be the case that there is incorrect delimitation, and thus the column count is correct but is simply malformed. In another case, records may have the missing columns, but this information can be inferred by the meaning of the column: using defaults, associated content, or some external fact/reference table. As such, reorganizing even a single, basic structured data source, such as a CSV file, into a "healthy" state can be a significant effort. When the data is disjoined and disparate at scale (e.g., hundreds of files in a data warehouse or in object storage), the task may be very costly.

Prior approaches for performing normalization take raw data sources, such as found in a data warehouse, and normalize them each time a unique analytic workload arises. In other words, due to its largely case-by-case and ad-hoc nature, a normalization process applied to one data source (for example, data relating to e-commerce transactions year-to-date) cannot be easily applied to other data sources, even if related (for example, data relating to e-commerce transactions year-to-date, one month later). As a result, previously normalized data, for a different workload, is often re-used even though it is an analysis risk (i.e., stale data). Existing normalization technology and tooling use large amounts of compute and storage, code execution, and highly skilled data engineers to ready big data for analytics. Even if an organization has the resources to constantly reexamine sources, the amount of duplications, particularly at scale, can be cost prohibitive in terms of storage space and processing resources.

Aspects of the present disclosure store data in a data edge format, which represents the raw data source as a complete mirror without loss of information, yet allows for streamlined cleaning and preparation operations at scale. Once a data source has been converted to a data edge format, it becomes an identical source of "truth" and does so without losing meaning typically associated with cleansing and preparation operations. That is, a data edge file is configured such that it mirrors (i.e., models) a raw data source, whether irregular or malformed, and reproduce the source in its lossless entirety. Conventional analytical data stores, such as column-stores or text-stores, which typically require transformation of data to fit into their internal structure, and thus are one-directional, "lossy" form of persistence. This "lossiness" is also where analytical inaccuracies can be introduced: for each transformation a data sources undergoes (cleaning/preparing), the likelihood of analytical errors increases. In contrast, according to aspects of the present disclosure, one aim of the data edge files is to mirror raw sources such that the representation can reproduce an identical data source in a lossless fashion. From a normalization viewpoint, such a representation can be used as a "source of truth" that can be repeatedly cleaned and prepared (quickly and easily) for future analysis.

Another technical advantage of using the data edge format during normalization is that data edge format enables a file to be compressed below standard compression algorithms' theoretical minimums, thereby reducing storage space. That is, data edge enhances any compression algorithm such that it promotes improved reduction in size, while acting as an indexing column and text store with their associated analytic operations/statistics. In other words, data edge can represent information, both in-memory and on-disk, in a smaller footprint that traditional tooling, allowing for normalization at a greater scale than otherwise would be possible. Additionally, the unique separation of symbols and locality provided by the data edge format allows each transformation to be less costly in computing and storage sources. As described in detail below, whether normalization is related to cleaning, shaping, aggregating, and/or correlating, the data analysis service does not physical transform the symbols, but rather the symbol's locality of reference.

Referring back to FIG. 1, the process to create a converted file 120 from a data source may be extended to an indexing procedure that processes multiple data sources to form a "data edge index," which is an indexed form of the one or more data sources. Similar to the converted file 120, a data edge index includes at least one manifest portion 126, one or more symbol portions 122, and one or more locality portions 124. The manifest portion 126 contains schema information, statistics, metrics, and other metadata related to the original data source(s), to the data edge index, and to the indexing processing performed. The symbol portions 122 contain all the symbols found in a data source file (e.g., ordered internally). The locality portions 124 contain values representing the respective locations of those symbols in the original data sources (i.e., raw/refined source). The combination of the manifest, source, and/or locality files can be used to normalize the data from the data sources files to eliminate redundant data, minimize anomalies, fill in missing or incomplete data, and provide statistics that can be used to more efficiently resolve certain types of search queries on the original data sources. During the indexing process, a root and branch type data structure can be generated to summarize multiple manifest files of a single data edge index, such that several manifest files are combined or summarized into leaf nodes.

Figure 9:
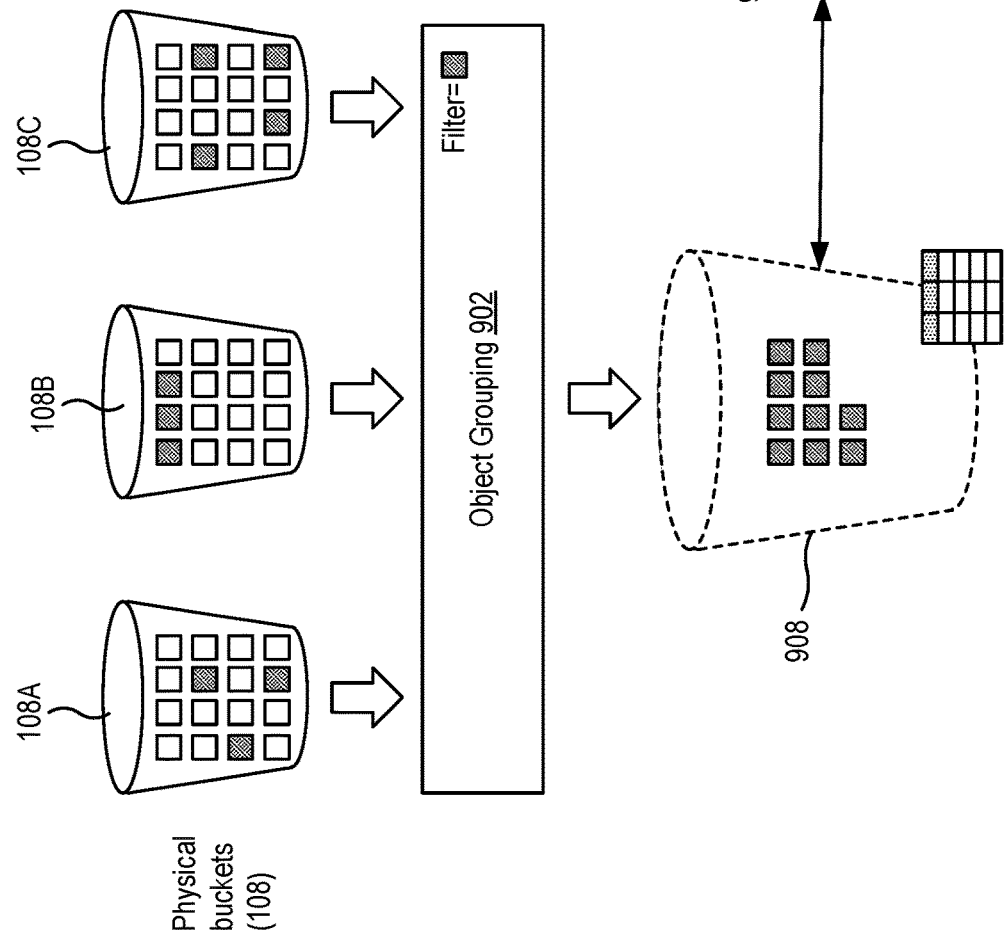
FIG. 9 illustrates operations for organizing and indexing data sources into virtual buckets, according to an aspect of the present disclosure.

FIG. 9 illustrates operations for organizing and indexing data sources into virtual buckets, according to an aspect of the present disclosure. Virtual buckets are an abstraction layer on top of object storage that acts as a logical lens or view into data sources and supports multiple modeling functions, including aggregation, transformation, and correlation. Virtual buckets may be live and linked to "physical" buckets, which means when a physical bucket (i.e., bucket 108) is updated, the associated virtual buckets can be updated as well, on the fly. Additionally, unlike a traditional extract, transform, load ("ETL") process in which data is loaded into a separate data warehouse, the data inside virtual buckets remains in place within the user's object storage. A virtual bucket can be seen as a logical description similar to that of a relational table, but geared towards object storage bucketing constructs. In other words, a virtual bucket is a schema that describes a data source's initial representation (raw) and/or a new transformation (e.g., shape, aggregate, correlate). This relation is on-demand and lazy (i.e., late). In other words, its construction is on the fly and built using the current state of one or more data edge indexes where the materialization aspect of the description takes the representation or transformation and feeds it to search and/or query resolution logic.

The data analysis service 106 can publish an indexed data source(s) as a virtual bucket 908, which are configured similar to the physical buckets 108 (i.e., supporting a similar flat hierarchy and organization) but that also support execution of analytics and search queries, such as text searches and relational queries. That is, a virtual bucket 908 is a logical and virtual container for data 105 that is stored in physical buckets 108 of the object storage system 103 (i.e., data in a single physical bucket, data across multiple physical buckets) and that has been indexed in the form of a data edge index 910 to support the execution of text search and relational queries on that data which is not conventionally available in object storage systems. The virtual bucket 908 may be defined, in part, by an internal schema and sort order (e.g., as specified in the manifest portion 912) thereby providing normalization, materialization, and data virtualization features to the data stored in object storage.

In an aspect, the creation of virtual buckets 908 can have two origins. First, a virtual bucket 908 may be created (e.g., by the file converter 110) as the initial data edge index 910 of object data, having a schema and sort order is the lossless state of the original raw sources (data 105). In other words, the materialization of this index, which is akin to a relational database generalized selection (i.e., "SELECT*"), will reproduce the exact raw source state of data 105. Secondly, each data edge index 910 may be refined using one more normalization or transformation operations, which creates a new virtual bucket that is named and can be seen as a new data edge index that can be analyzed and/or used as another index to be refined again. For example, a data edge index 910 may be transformed by a change in schema types (i.e., columns), a change in schema type names, a change in the order or shape of the schema, a change in the data set sort order by type, or an aggregation or correlation between two or more indexes 910. The transformed data edge index may be implemented by a modification to the existing manifest file or creation of a new manifest file, while the linked-to data edge symbol and locality files remain unchanged. In an aspect, all normalizations and transformations are essentially only descriptions where each description can be applied in sequence to produce the desired data set. Each normalization and/or transformation operation may be executed on-demand. That is, a new manifest file that describes or specifies new transformations, aggregations, correlations, or sort orders, and any combination thereof can be executed on the data edge symbol and locality files dynamically and in a desired sequence to produce a certain data set.

To form a virtual bucket, the data analysis service 106 introduces a new construct referred to herein as an object grouping 902. The data analysis service 106 may define one or more object groupings 902 within the object storage system 103 to select and/or filter which data objects should be included within a data edge index. Once data objects have been indexed, the data analysis service publishes these indexed groups as virtual buckets 908, which can be further refined and/or analyzed. The virtual buckets act as a lens into analyzing data in object storage. The use of virtual buckets improves the functioning of the computer storage system by removing the necessity of moving data out of object storage for ETL and data warehousing purposes, or of building complicated and costly scaffolding to use either an external text search and/or relational database. Object groupings 902 act as a form of "virtual folder" to quickly filter from a single physical bucket or to filter and aggregate data objects from multiple physical buckets into a single logical grouping. In contrast, bucket listing and filtering in known object storage systems can be extremely slow, particularly when there are millions of objects within a physical bucket 108. Object groupings 902 scope data in a physical bucket to partition out (i.e., filter out) unrelated objects in object storage. Via an object grouping, the system indexes the content. During a Discover operation performed on a physical bucket, the system indexes the metadata of the bucket via the data edge index. As a result, the object grouping 902 can issue filter requests not through conventional object storage APIs (e.g., S3) but through the data edge index, thereby providing faster operations and lower latency.

In an aspect, the data analysis service 106 may generate an object grouping 902 that specifies criteria for filtering data objects within one or more specified physical buckets, wherein data objects that satisfy such criteria are included in a corresponding data edge index. For example, an object grouping 902 may specify a data type of only CSV files to create a virtual bucket 908 of CSV files for further analysis. In the example shown in FIG. 9, CSV files contained in the physical buckets 108A (having three CSV files), 108B (having three CSV files), and 108C (having four CSV files) are depicted as squares with a shaded background. The resulting virtual bucket 908 is constructed based on a data edge index 910 created using the ten CSV files as the underlying raw data sources. For example, the object grouping 902 may include the following data sources having structured data about a company's customers: "3M-customers.1.csv", "3M-customers.2.csv", and "3M-customers.3.csv".

The file converter 110 (e.g., an indexer) of the data analysis service may then generate a data edge index 910 based on processing of all the data objects filtered by the object grouping 902. The created data edge index 910 includes at least one manifest file 912 (e.g., "cs_mds") that describes the object grouping (i.e., virtual filter) used to create the data edge index as well as the schema for the associated virtual bucket 908. Using the above customer CSV example, the file converter 110 may generate a manifest that includes specifies a source schema of the data sources having six fields as follows:

First Name—String
Last Name—String
Street—String
State—String
Sex—String
Age—Number In some aspects, the manifest file 912 may be updated as a result of any refinement or transformation operations performed on the data edge index, which may result in the creation of a new manifest. In an aspect, the manifest file 912 includes statistics and metrics about the indexed data, which were compiled during the indexing process contained in a source file(s), which were compiled during the indexing/conversion process, and may be updated as a result of any normalization, refinement, or transformation operations performed on the data edge index. Such statistics which provide enough information to either resolve a specific statistical analysis or request and/or scope (i.e., reduce) object storage access, without accessing to access the underlying symbol files, locality files, or raw source data, or at least with reduced accesses compared to the known techniques. The statistics may include information about the type or format of source file 115 (e.g., CSV, JSON, XML, log file, etc.), and information indicating the type(s) of data in the source file 115 (e.g., structured, semi-structured, unstructured, Strings, Numbers, text data). The statistics may further specify any structure(s) in the data sources. In an aspect, the statistics may specify, for each column of data in the underlying data source, "minimum" and/or "maximum" symbols which are the symbols that would be first in sequence and last in sequence, respectively, if all the symbols in a data range (e.g., a particular column) were in a sorted order. In one aspect, the analytics module 112 may calculate statistical functions of the source data, such as the minimum, maximum, average, mean, cardinality, standard deviation, and count of a particular column in the data source. Based on statistics, the data analytics module 112 may be configured to derive a scheme of a data source, such as a type of column (e.g., string, integer, time), or a name of a column if the data matches a certain format (e.g., time, email, URL). Lastly, based on statistics, the data analytics module 112 may be configured to identify patterns and use them to remove, replace, or repair datasets. Taken together, the data analysis service 106 is able to use data edging to clean irregular or malformed data sources.

With this statistical information, cleaning and preparing by the analytics module 112 can intelligently add, remove, replace, and fill any aspect of the analytical result set, whereas conventional analytic tools require the data set to be in a well formed shape (e.g. rows and columns of the same length and type). Even in the normalization step, knowing that the data source is well-shaped allows for classic linear/relational operations. As a result, the data analysis service 106 purposely normalizes the data source representation "internally" (i.e., within the data edge file), but when asked to reproduce the raw data source, can strip out this normalized aspect. In one approach, normalization operations that clean, shape, aggregate, and/or correlate the data within the data edge files are reflected by changes to existing locality files or by the creation of new locality files. In another approach, the normalization operations and representations of data are described via materialization-like descriptions found in the manifest files 126. Both such approaches are described in greater detail below.

In some aspects, the manifest file 912 describes the associated manifest, symbol file(s), and locality file(s) backing files/topology. For example, in cases where the index is comprised of multiple pairs of symbol files and locality files, the manifest file may specify which of the symbol files is associated with which of the locality files, and that they represent which raw data source (e.g., original CSV file). In one implementation, a symbol and locality file pairing may be represented and encoded using a common file name prefix, such as the following index listing:

00002221705892834674.cs_mds # describes each manifest S/L pair
00002221705892834674.cs_i2s # symbol—1
00002221705892834674.cs_l2 i # locality—1
00386293091707968143.cs_i2s # symbol—2
00386293091707968143.cs_l2 i # locality—2
00420729860046531555.cs_i2s # symbol—3
00420729860046531555.cs_l2 i # locality—3

The data edge index 910 further includes one or more symbol files 922 (e.g., "cs_i2s") that each contain the symbols of the indexed data sources. In some aspects, the symbol file 922 may be arranged similar to the symbol files 122 described earlier, and may be extended to include information relating to a number of hits. The number of hits specifies the number of times a given symbol occurs within a locality file. In other words, a symbol file has one reference and hits indicate how many times this symbol appears in the locality file (i.e., original raw data representation). For example, the symbol file may have a format of <symbol>:<count>:<delimiter>, <symbol>:<count>:<delimiter>, etc. In an aspect, the data analysis service 106 may perform a symbol lookup on the symbol files 922 for text search and relational queries, i.e., to determine a given data source satisfies the text search or criteria of the relational query. In one implementation, the data analysis service 106 may perform a lookup using a binary search algorithm on the ordered listing of symbols in the symbol file to determine whether the underlying data source satisfies text search criteria.

The data edge index 910 further includes one or more locality files 924 (e.g., "cs_L2l") that each specify the locality of the indexed data source (i.e., where symbols are located). In an aspect, the locality files 924 may be organized into one or more locality rows having a hidden key to represent ordering of the raw or refined data source. In an aspect, the locality files do not contain physical hidden keys, but rather this is a logical concept implemented during execution of searches and queries. The hidden key is a physical order of the raw data indexed, or the logical order based on some searches and/or queries. During searches and/or queries, an array of positions (i.e., a virtual column) is ordered and/or reduced based on the search/query. Once the final array is created (based on the search/query predicates), the array can be used to materialize the results via the locality and symbol files. The data analysis service 106 may execute a query plan having relational operations or clauses that finalize a returned result set (e.g., ORDER, GROUP, JOIN) using the locality files and without requiring the use of the symbol files. In an aspect, such relational operations (e.g., ORDER, GROUP, JOIN) only work on the specific column localities. For example, only locality files (and not symbol files) needed to do an ORDER, GROUP, or JOIN operation(s), until the final materialization is performed to resolve the final result set, at which point, the associated symbol files are used. As discussed above, the same applies to operations such as SEARCH where only symbol files are needed (and not locality files), and when the final materialization is performed, then the associated localities are needed.

The manifest file(s) 912 of the data edge index can be arranged in a tree-like data structure that summarizes portions of the manifest for faster access and query execution. In an aspect, for each logical index, there may be a root manifest file (i.e., "M-Root") that describes the topology of the dataset. Manifest files can be summarized and reference other "leaf" manifest files, which can represent an amount of raw data up to a threshold limit (e.g., 100 GB). These manifest files are configured to scope requests to resolve a particular search and/or query. In other words, the manifest files may be used to determine whether a particular symbol and locality file pair does not have information related to a specific request. The use of such manifest files greatly reduces the number of object storage system access requests that the data analysis service 106 needs to materialize a result.

Irregular Fill Operation

Figure 6A:
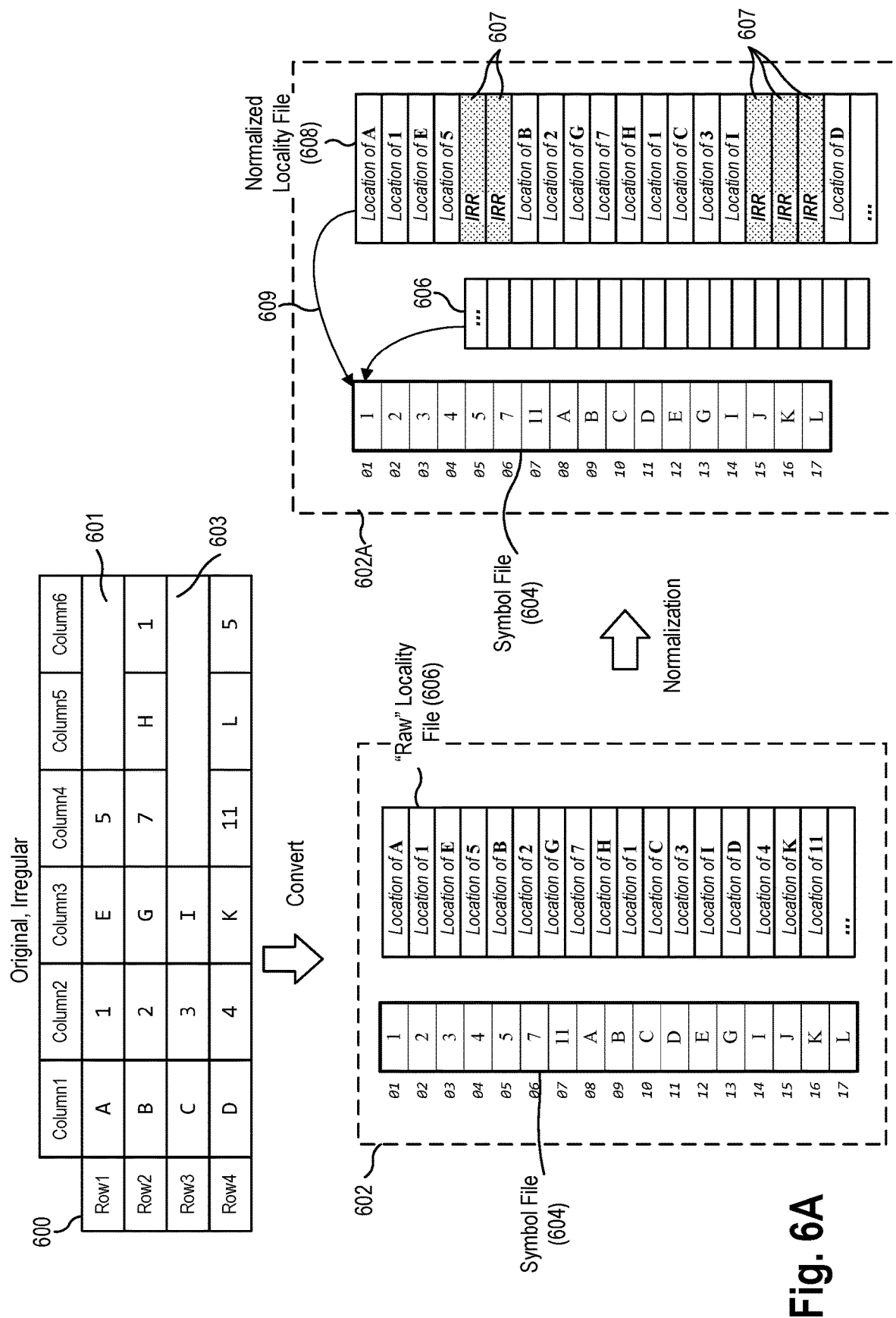
FIGS. 6A, 6B, and 6C are block diagrams depicting a conversion and normalization of an irregular or malformed structured data source file to a data edge file according to an exemplary aspect.
Figure 6B:
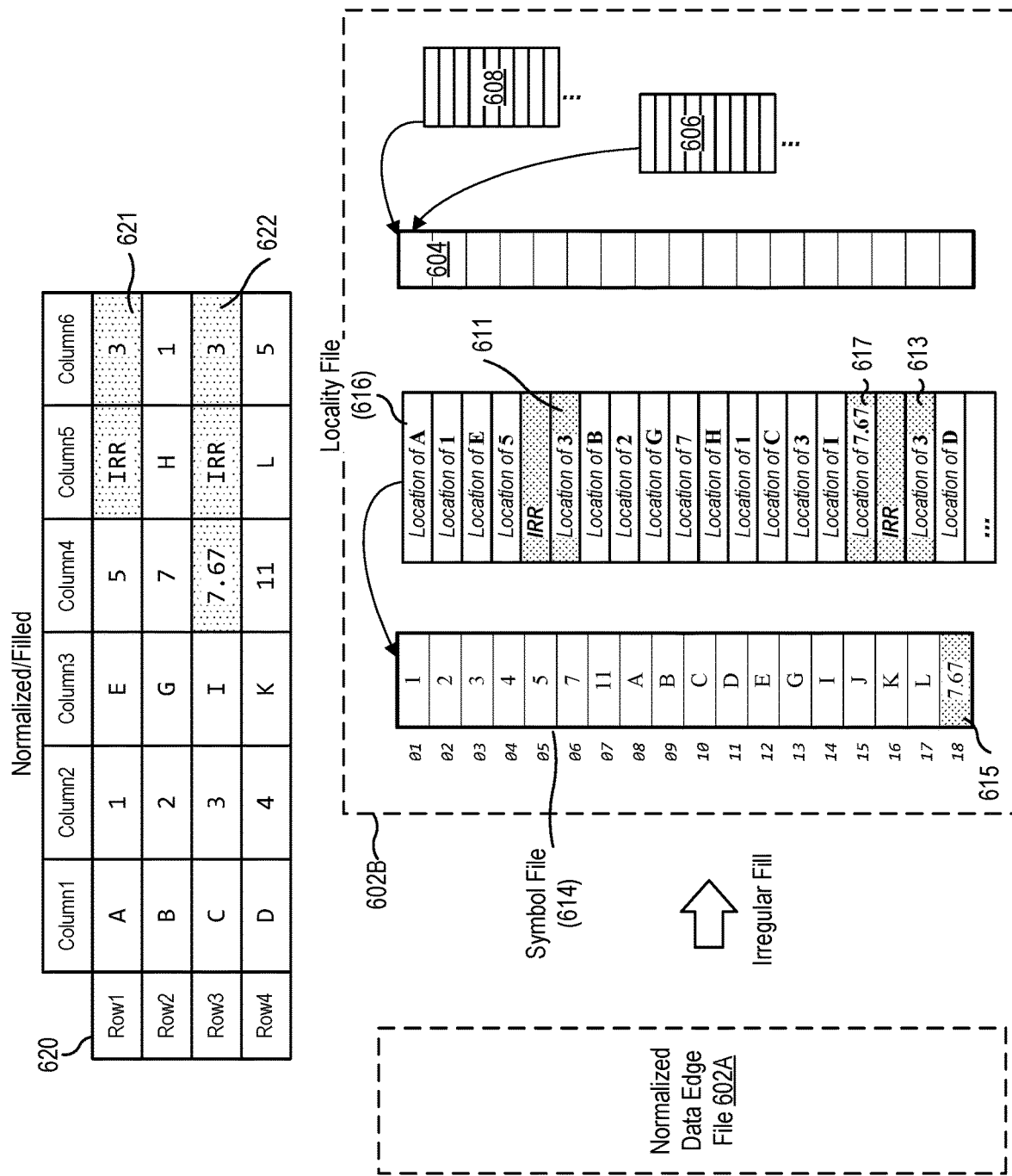
Figure 7:
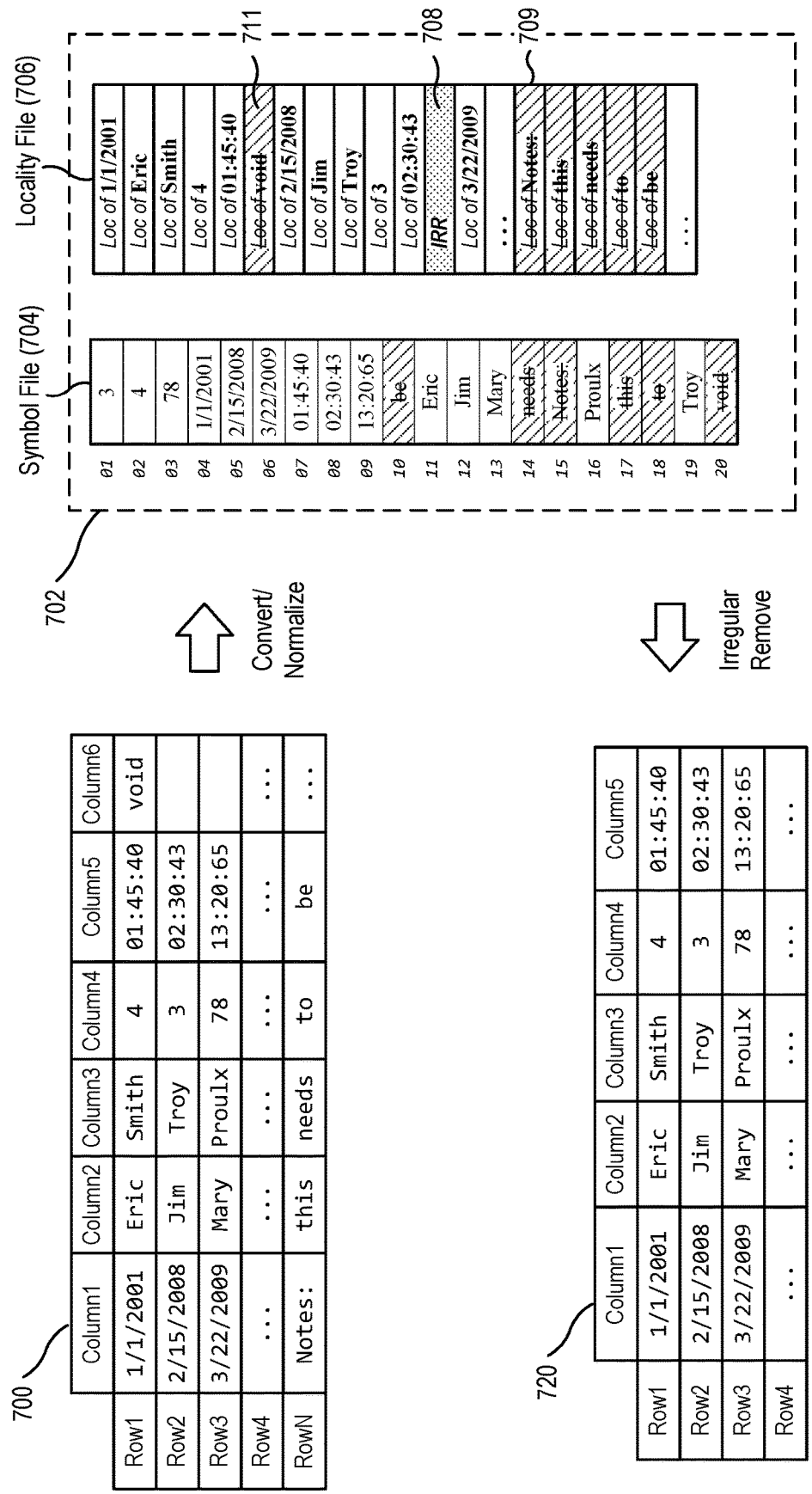
FIG. 7 is a block diagram depicting a conversion and normalization of another irregular or malformed structured data source file to a data edge file according to an exemplary aspect.

FIGS. 6A and 6B are block diagrams depicting a conversion and normalization of an irregular or malformed structured data source file 600 to a data edge file 602 according to an exemplary aspect. Similar to the source file 200 of FIG. 2, the source file 600 contains structured data having a plurality of records organized into rows and columns. The structured source file 600 is rendered in FIG. 6A in a table format for sake of illustration, but it is understood that the structured data may be encoded in a variety of formats. For example, the source file may be a delimiter-separated file (such as a CSV file) containing a plurality of records (i.e., lines), where each record is comprised fields separated by a delimiter (e.g., comma). In another aspect, the structured source file may be a log file containing a plurality of log entries, e.g., separated by a tab or whitespace character.

Based on the source file 600, the file converter 110 may create a data edge file 602 having a symbol file 604 that contains each unique symbol found in the source file 600, and a locality file 606 containing each location of each symbol in the source file 600. In contrast to the earlier-discussed source file 200, which can be characterized as a well-formed CSV data source, the source file 600 may be irregular or malformed. As shown in FIG. 6, the first row of data is missing fields for Column5 and Column6, and the third row of data is missing fields for Column4, Column5, and Column6.

In one aspect, the file converter 110 may be configured to perform internal normalization on the source data during conversion to the data edge file 602 by modifying the raw locality file 606. For instance, if a CSV source file has an irregular number of columns, the file converter 110 may be configured to fill in empty locations with a special locality value 607 such that the maximum number of columns is reached for each row. The locality file 606 contains one or more special locality values, referred to as empty localities 607, at a particular location within locality file 606 representing that data is missing at the corresponding location within the original source file 600. The empty localities 607 are depicted in FIG. 6A with the label "IRR." In some aspects, the empty locality value 607 may be a pre-designated value (e.g., "null") that is unique to the symbols and location values in the symbol file and locality file.

The "IRR" is a special or unique symbol indicating that this "cell" or field in the matrix is denoting an initial data edge "fill" so that each column is shaped consistently. The symbol can be any actual value, but the ability to recognize it as an initial fill is the point. The IRR label is the visual representation of "filled in denoted IRRegular cell". The use would be during the user normalization process below. The IRR value at a respective position within the locality file represents an omission of data at the respective position in the source file.

It is noted that, this "empty" locality value can be ignored or stripped out when reproducing the raw data source from the data edge file 602. Additionally, during the normalization process, the data analytics module 112 may use these empty localities to indicate that rows should be removed or to identify an opportunity to fill or update in a particular column with estimated values or default values based on statistics (in the manifest 126) gathered from the initial data edge analysis. In one aspect, using a locality value to represent an empty location within the data source provides a unique ability to derive patterns or shapes of the data source. It may be the case that an irregular or malformed data source is the result of delimitation that is malformed. Aspects of the present disclosure may use pattern recognition to determine where the malformation is and how to fix it.

In some aspects, the file converter 110 may modify the data edge file (depicted as data edge file 602A) to create a "normalized" locality file 608 that is separate from the "raw" locality file 606 that incorporates the special locality values 607. The normalized locality file 608 taken together with the symbol file 604 (as depicted by a dependency 609) represents a normalized version of the data source 600, while the raw locality file 606 with the same symbol file 604 represents the original raw data source. By using separate versions of the locality file, the data edge file format is able to maintain a "source of truth", in which the original data source can be recreated by discarding the normalized locality file and using the raw locality file 606 to re-generate the original data source file, as described earlier. In another aspect, the original data source can be recreated using the normalized locality file by scanning through the location values in the locality file, discarding the empty locality values ("IRR") and any filled locality values (e.g., which can be denoted by a special symbol or delimiter), determining a respective symbol from the symbol portion using the respective location value as a lookup index in the symbol portion, and inserting the determined symbol into a re-created source file. It is noted that subsequent normalization operations (e.g., irregular fill, remove discussed later) may be performed on the normalized locality file 608, or using yet another instantiated version of the locality file.

In an alternative approach to normalization, the file converter 110 may be configured to, during conversion to the data edge file 602, annotate the source data with descriptive information and statistics that can be used at a later point in time to dynamically normalize the source data when the data is being retrieved and/or analyzed by the data analysis service 106. Rather than modify the raw locality files 606, the file converter 110 may generate manifest files 912 during indexing that describe or represent the source data in a manner that can be used to "dynamically normalize" the data (clean, shape, aggregate, and/or correlate the data associated with the locality file) at time of retrieval and use. For instance, if a CSV source file has an irregular number of columns, the file converter 110 may generate a schema that is stored in the manifest and that denotes a normalized number of columns (i.e., the maximum number of columns in the CSV source file). Upon later retrieving the data of the CSV source file, this schema can be used to normalize the returned data set (or a materialized view) by filling in empty locations with some value, such as an empty locality 607 or a statistical fill, for all returned rows having less than the normalized number of columns until the normalized number of columns is reached for each row (as specified by the manifest). Under this late materialization approach, the converted data source is not laden with empty locality values or other space allocations while stored in object storage, thereby improving storage resource utilization.

In one aspect, the file converter 110 may create a new "normalized" manifest file within a tree-based structure of manifest files (shown in FIG. 9), which taken together with the raw locality file 606 and symbol file 604 to represent a normalized version of the data source 600, while the raw locality file 606 with the symbol file 604 by themselves represent the original raw data source. The manifest files 912 contain information specifying the schema or the shape of data (e.g., a count of fields, type of data for each row). By using the manifest files 912, the system is able to dynamically generate all new or modified representations of the data via a description, while the data edge file format is able to maintain a "source of truth," in which the original data source can be recreated by disregarding the descriptions contained in the modified manifest portions.

In yet another alternative aspect, the file converter 110 and/or data analysis service 106 may selectively apply a combination of both approaches, depending on the optimal performance size versus time costs. The data analysis service 106 may apply the physical approach that creates or modifies actual locality files based on a determination that the scope of change of the requested normalization operation is less than a threshold amount, and apply the virtualized/materialized approach that uses manifest files in response to a determination that the scope of normalization exceeds the threshold. For example, the insertion of empty locality values would be appropriate if the normalization operation would only involve the irregular fill of one or two row entries in a data source. Meanwhile, the insertion of description indicators in a manifest file would be more resource-efficient and faster to execute normalization operations over thousands of row entries in a data source.

In another aspect, if a malformed CSV source file has a column with more than one symbol within its delimitation, the file converter 110 may be configured to treat this column as a text source and process this column using the techniques described earlier (see, FIG. 4 and FIG. 5). In other words, this malformation is from the perspective of relational operations and not from text search. As described in the aspect involving the text-based data source, this column may be regarded as a one-dimensional array from the perspective of both the symbol and locality file. Thus, conceptually, a CSV is a two-dimensional matrix where this text column can be viewed as a third dimension starting at the location of the row/column coordinate.

In one example, the data analytics module 112 may model the data source 600 shown in FIG. 6A as a "source of truth," complete with the missing data (e.g., empty localities). In an aspect, the data analytics module 112 may update the manifest files associated with the data source 600 to describe a shape and type of the data source (e.g., a log file type having 6 columns), along with the associated statistics shown below in Table 2. The model will also statistically analyze existing data as well as shapes in order to create a best fit scenario for normalization to take place in a virtual bucket step. In this case, modeling will produce the following statistics shown in Table 2 below. In one aspect, the data analytics module 112 may display the statistics in response to a function invoked by the interface 107 (i.e., "Show Statistics").

TABLE 2

Sample Statistics for Data Source

| Statistic | Column1 | Column2 | Column3 | Column4 | Column5 | Column6 |
| --- | --- | --- | --- | --- | --- | --- |
| count | 4 | 4 | 4 | 3 | 2 | 2 |
| sum |  | 10 |  | 23 |  | 6 |
| min | A | 1 | E | 5 | H | 1 |
| max | D | 4 | K | 11 | L | 5 |
| mean |  | 2.5 |  | 7.67 |  | 3 |
| median |  | 2.5 |  | 7 |  | 3 |
| std |  | 1.29 |  | 3.06 |  | 2.82 |
| type | String | Number | String | Number | String | Number |

The data analytics module 112 generates, for each column of data, statistics such as a cardinality (count), a sum value, a minimum value, a maximum value, an average (mean), median, and a standard deviation. For example, the data analytics module 112 may generate statistics for Column4 indicating a count of 3 records (rows) having data in that column, a sum total of 23 (i.e., 5+7+11=23), a minimum value of 5, a maximum value of 11, an average value of 7.67, a median value of 7, and a standard deviation of 3.06. It is noted that the data analytics module 112 may generate different statistics based on the type of data in a column. Statistics for columns containing string or text data may include text-search-related statistics such as distance, correlation, and association.

In some aspects, the data analytics module 112 may create one or more summary files ("SUM" files) that collect and aggregate all manifest files 126 such that one can see the summary as a root of very large datasets where there are multiple locality, symbol, and manifest segments (i.e., chunks). The reason for the SUM files is to access one file to answer schema- and statistics-related questions efficiently (e.g., without having to parse through the original data sets at request time, or even multiple manifest files at request time). The SUM file(s) are arranged to be much smaller in size than the total manifest files described via aggregations. Listing 1 below provides a sample manifest file 126 (e.g., 03553415377955225776.MDS) for a corresponding segment of source data.

Listing 1: Sample Manifest File

```
{
  "segments": [
    "03553415377955225776"
  ],
  "schemadf": [
    ["timestamp","TIMEVAL"],
    ["elb", "STRING"],
    ["client_ip", "STRING"],
    ["client_port", "NUMBER"],
    ["backend_ip", "STRING"],
    ["backend_port", "STRING"],
```

-continued

Listing 1: Sample Manifest File

```
["request_processing_time", "NUMBER"],
["backend_processing_time", "NUMBER"],
["response_processing_time", "NUMBER"],
["elb_status_code", "NUMBER"],
...
],
"metastat": [
    ["2630", "6000000", "6000000", "6000000"],
    [ "1560560550996", "1590560621029", "6000000", "6000000"],
    ["us-east-2a-elb", "us-east-2a-elb", "6000000", "6"],
    ["0.0.106.232", "99.99.99.39", "6000000","5999185"],
    ["5000.0","6000.0","6000000","6006"],
    ["10.0.0.102:80","192.168.99.9:80", "6000000","3985311"],
    ["","" , "6000000", "6000000"],
    ["1.0E-5","9.9E-5", "6000000","426"],
    ["0.1", "0.999999", "6000000", "3347556"],
...
}
```

As shown in Listing 1, a manifest may include a portion identifying the segment which the instant manifest describes (e.g., "03553415377955225776"), a schema portion (e.g., "schemadf") that specifies the shape of the data found in the associated segment, and a statistics portion (e.g., "metastat") related to that segment. In one implementation, the schema portion lists an array of columns, in which each column is a pair of values specifying a name of the column (e.g., "timestamp", "client_port") and a data type (e.g., "TIME-EVAL", "NUMBER"). In one implementation, the statistics portion of the manifest file may also have a corresponding array of statistics for each column. For example, the manifest file lists statistics compiled for data in the column "backend processing time" as having a minimum value of "0.1", a maximum value of "0.999999", a total count of "6000000", and a cardinality of "3347556" (i.e., the number of unique data values in the column). As described below, such statistics can be retrieved from the manifest and used for data normalization (under either a physical fill approach, or a late-materialization/virtual approach).

Listing 2 provides an example summary file for several manifests, of which the sample manifest file (03553415377955225776.MDS) is one. The summary manifest file can be arranged similar to the manifest file shown in Listing 1, except that it specifies a plurality of segments (rather than a single one) which the instant summary describes.

Listing 2: Sample Summary File

```
{
    "segments": [
        "03553415377955225776",
        "07046858028439463183",
        "00274607173467632293",
        "07233019083911555317",
        "08113215946245625815",
        "07527092473296114601",
        "03598590506287071662"
    ],
    "schemadf": [
        ["timestamp", "TIMEVAL"],
        ["elb", "STRING"],
        ["client_ip", "STRING"],
        ["client_port","NUMBER"],
    ...
}
```

In some aspects, the data analytics module 112 may "infer" or determine a data type for each column based on an analysis of the symbols contained in that column, such as "String", "Number", "Time". For each locality, symbol, or manifest segment (i.e., chunk) in a data edge index, the system attempts to detect the type of data (e.g., string, number, date). This process of data type detection may be executed during a sorting of the symbol files (I2S) and seeks to normalize the data type. Statistics may be collected during this phase (thereafter stored in the manifest segments) and certain data types are demoted as irregular (i.e., not expected). For instance, the system could determine that a particular column is a date, where the date is a known string format and/or number. If during the symbol sorting step a parse fails, then the data type of the column could be demoted to only a number (or worse, down to a string, where all symbols at a minimum can be.)

In one aspect, the data analytics module 112 may be configured to provide information pertaining to shape of data. The shape of data may be represented by a count of fields and type of data for each row. A well-formed data source is characterized as having a uniform shape across its records (i.e., rows and columns). In some aspects, the shape information may be determined based at least in part on the presence of the "IRR" symbols representing an initial fill of the data matrix. Using the example data source 600, data analytics module 112 would provide shape information indicating 3 different shapes contained within the data source: Row2 and Row4 having a shape corresponding to "String/Number/String/Number/String/Number", Row1 having a shape corresponding to "String/Number/String/Number", and Row3 having a shape corresponding to "String/Number/String". This shape and type information suggests that the modeled information is all valid, but incomplete.

In some aspects, the data analytics module 112 attempts to determine a universal data schema across all data sources being indexed as part of a single index (e.g., data edge index 910). This schema is the superset of all defined columns found in the data sources. However, during the indexing process of a data source, parts (i.e., certain rows or entries) may not have all columns. To reduce the size of empty or irregular columns stored in locality segments and symbol files, only the manifest or SUM files describe nonexistent columns for a particular segment where the symbol and locality files contains actual, real raw data. This is a significant difference from known normalization techniques where classic relational databases pre-allocate memory and storage resources for all this empty space. When data sources are very sparse (e.g., JSON), aggregate columns could be in the thousands, resulting in a significant cost in storage and processing. As a result, the described data edge techniques advantageously reduce the resources needed to keep the data stored and processed. In some aspects, the non-existent columns of a segment may be referred to as a virtual column (versus a physical column), because they are not stored or sent via communications. Rather, the manifest files and SUM files allow for intelligent materialization when needed for analytical analysis.

In one aspect, the data analytics module 112 may be configured to perform an irregular fill of data in a data edge file 602 to fill a maximum number of rows and columns within the data. In this case, the normalization step will expand the 2-dimensional representation to fill the maximum rows and (six) columns. Here, all rows are kept, and two rows are expanded to six columns (i.e., Row1 gains two columns of type String and Number, respectively; Row3 gains three columns of type Number, String, and Number, respectively). An example 2-D representation of the normalized data edge file 602 is represented by matrix 620, having expanded rows 621 and 622.

As shown in FIG. 6B, the data analytics module 112 may modify the data edge file 602 (represented as 602B) to create new symbol file 614 based on the symbol file 604, and a new locality file 616 based on the normalized locality file 608, which incorporate changes resulting from normalization operations. The data analytics module 112 adds columns to certain rows by inserting corresponding entries into the locality file 616 and, if necessary, the symbol file 614. In one aspect, the data analytics module 112 inserts a location value in a position of the locality file 616 corresponding to the position (coordinates) of the record being filled in.

In another example, for numbers, the data analytics module 112 may insert a locality value for a mean value of that column and, if necessary, a corresponding symbol for the mean value into the symbol file 614. It has been determined that using the mean value for an irregular fill enables most aggregates on the column itself to remain stable even with the addition of the filled value. Using the example shown in FIG. 6B, the data analytics module 112 determines that the mean value for records in Column6 is "3" according to the generated statistics of Table 2. The data analytics module 112 then determines the location value for the symbol "3" within the symbol file (i.e., "03"). The data analytics module 112 inserts (or in the case of a normalized locality file, replaces the IRR value with) the location values ("Location of 3") at a position 611 within the locality file 616 corresponding to the first row and sixth column, and at a position 613 within the locality file corresponding to the third row and sixth column. It is noted that because the symbol "3" is already in the symbol file, this fill operation did not necessitate a change to the symbol file 614. In other cases, it may be necessary to update the symbol file to reflect changes resulting from the irregular fill or removal operations.

For example, to perform an irregular fill operation on the record of Row3, the data analytics module 112 determines that the mean value for records in Column6 is the number "7.67" according to the generated statistics of Table 2. That data analytics module 112 determines that the symbol-to-be-filled ("7.67") does not exist within the symbol file 614, and in response, inserts a new entry 615 into the symbol file 614 containing the symbol "7.67". In the aspect shown, the new entry 615 is appended (i.e., physically, logically) to the symbol file 614 so as to maintain the current location values of the symbol files. In some aspects, a new symbol file may be created that is linked to the main symbol file 614. The data analytics module 112 then inserts or replaces the location value corresponding to the entry 615 ("Location of 7.67") at a position 617 representing the third row, fourth column.

In one aspect, the data analytics module 112 may perform an irregular fill of a column of numbers by inserting, into the locality file 616, a location value representing the symbol for a median value of that column. It has been determined that using the median value of a column with an odd count of values would not necessitate a change in the symbol file because it is guaranteed that the symbol for the median value is already in the symbol file by nature of the definition of a median value. For example, if the irregular fill operation on record 3, column 4 were performed using the median value of Column4, the location value for the symbol "7" would be inserted into locality file 616, and would not require a change to the symbol file.

In some aspects, the data analytics module 112 may be configured to perform a fill-type operation on a column of text data using a natural language processing (NLP) technique. For instance, a user may want to normalize all symbols to its morpheme level or using a partial parsing grammar. In some aspects, the data analytics module 112 may apply one or more NPL techniques to a String or column of text data (as discussed in conjunction with FIG. 5) to conform string or text data to a particular template or predefined value.

In the aspect depicted, the data analytics module 112 creates new symbol file 614 and locality file 616, while maintaining the existing symbol file 604 and associated locality files 606 and 608 (shown in simplified form). In this way, the original model "source of truth" is kept if the original or a differently normalized representation is necessary for analysis at a later time. In an alternative aspect, the data analytics module 112 may modify the existing symbol file 614 and locality files 608 directly without forking the corresponding files.

Figure 6C:
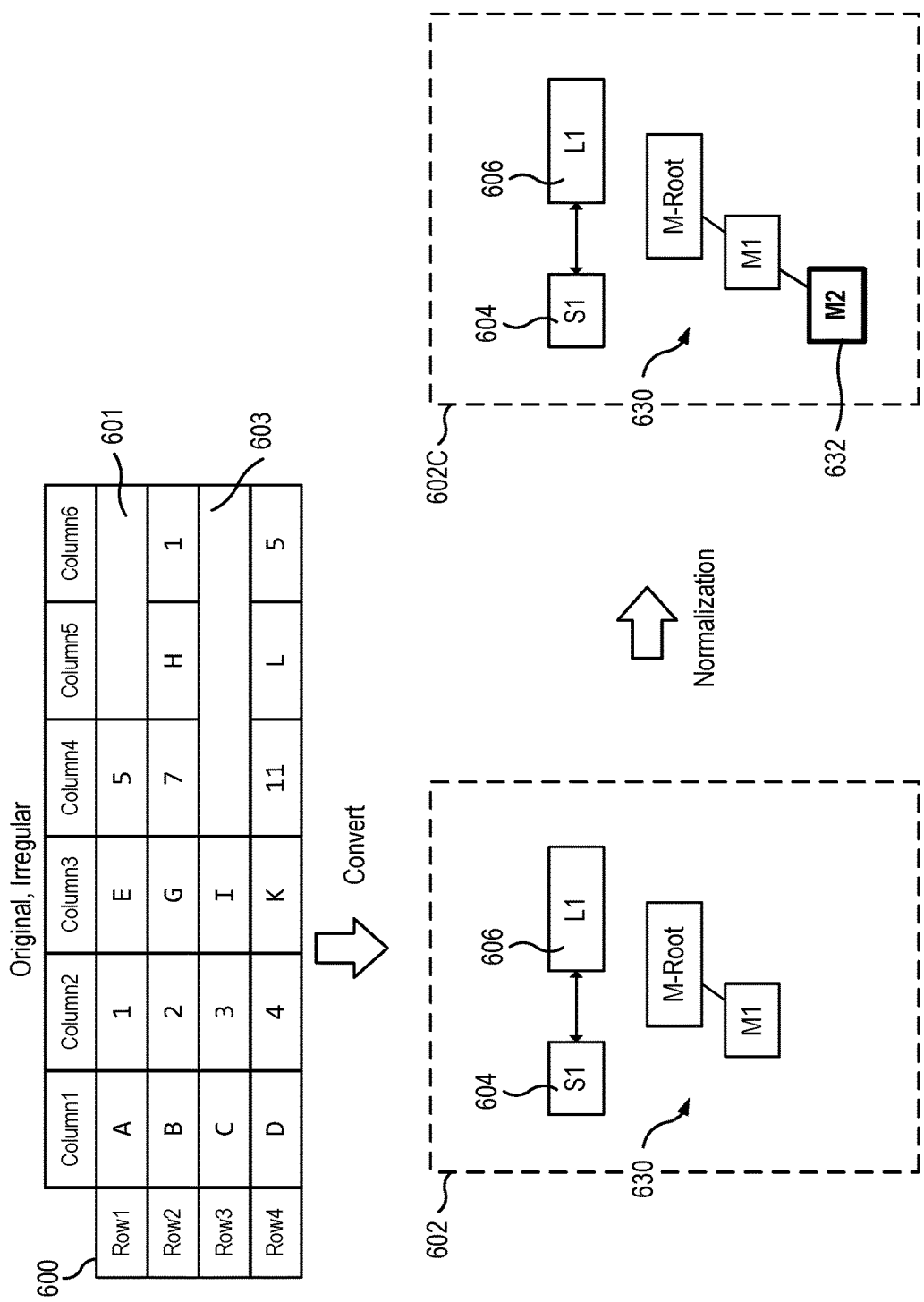

FIG. 6C is a block diagram depicting an alternative approach to indexing and normalizing the irregular or malformed structured data source file 600 to a data edge file 602 according to an exemplary aspect. In this alternative "virtual/logical filling" approach, the analytics module 112 modify the data edge file 602 (depicted as data edge file 602C) to modify the manifest files 630 or creates a new manifest segment 632 which incorporate metadata or schema changes that can be later used for normalization. Rather than modify the locality and/or symbol files (i.e., a physical fill approach), the data analytics module 112 in effect "adds" columns to certain rows by inserting a descriptive entry into the manifest file 632 that indicates the normalized "shape" of the data source. As shown in FIG. 6C, symbol and locality files 604, 606 of the normalized data edge file 602C are left unchanged.

As described earlier, the manifest file(s) 630 of the data edge index can be arranged in a tree-like data structure that summarizes portions of the manifest for faster access and resource efficiency. In an aspect, for each logical index, there may be a root manifest file (i.e., "M-Root") that describes the topology of the dataset. Manifest files can be summarized and reference other "leaf" manifest files. The manifest files 630 indicate the "shape" of a particular data source. The final/master (i.e. summarized) manifest can be updated to indicate the final shape (i.e. total columns). It is understood that as each data source (e.g., data source file 600) is indexed, it is "chunked" into segments. These segments are mapped to their own corresponding manifest that describes the true physical shape (i.e. source of truth) such that the master manifest is different from a sub-segment manifest used to fill the data source. In some aspects, the segmenting performed by the file converter is configured to chunk data sources such that there is more virtual or logical filling vs physical filling in locality files. If the fill operation has specified values (e.g. average value in a column) vis-a-vis an empty field, the statistics across the master manifest and sub-manifests can be used. During the normalization process, the data analytics module 112 may identify rows that deviate from a normalized schema specified by the manifest to identify an opportunity to fill or update in a particular column with estimated values or default values based on statistics (in the manifest 126) gathered from the initial data edge analysis. It is noted that the normalized schema information can be ignored when retrieval of the raw data source from the data edge file 602 is desired.

Irregular Remove Operation

FIG. 7 is a block diagram depicting a conversion and normalization of another irregular or malformed structured data source file 700 to a data edge file 702 according to an exemplary aspect. Similar to the structured data source files described earlier, the source file 700 contains structured data having a plurality of records organized into rows and columns. The source file 700 may include irregular or malformed data, for example, Column6 has a single value in Row1 only, and the last row (RowN) includes a free-form text sentence ("Notes: this needs to be . . . ").

The file converter 110 may convert the source file 700 into a data edge file 702 having a symbol file 704 that contains each unique symbol found in the source file 700, and a locality file 706 containing each location of each symbol in the source file 700. Using above-described techniques, the locality file 706 may include special empty locality values 708 inserted as an initial fill operation during conversion to maximize the column count of each record.

In one aspect, the data analytics module 112 may process the data edge file 702 and generate statistics and shape-related information associated with the data source. In one aspect, the data analytics module 112 may provide shape information indicating the following shapes contained within data source file 700: Row1 having a shape corresponding to a Time/String/String/Number/Time/String; Row2, Row3, and many other rows having a same shape corresponding to a Time/String/String/Number/Time, and a last row (RowN) having a shape corresponding to the data types String/String/String/String/String/String/ . . . /String.

Assuming the data source includes many rows having a same shape as Row2 and Row3 (a majority of which are omitted from the diagram for brevity of illustration), the general shape of the data source will become a 2-dimensional model for normalization. The data analytics module 112 may remove the sixth column (Column6), which only appears in the first row, based on a determination that the vast majority of the rows lack a value in this column, thereby deeming it likely to be an anomalous data. As such, the data analytics module 112 may modify the locality file 706 to remove the location value 711 corresponding to the anomalous data. In another example, the data analytics module 112 may normalize the data by removing the entirety of the last row (RowN) based on a determination that the last row has a shape (i.e., many Strings) that is completely dissimilar from the other row shapes. In some cases, such anomalous data in the last row of the source file footer information in the source file. To delete a row or column of data, the data analytics module 112 may remove location values from the locality file 706 at the positions representing the row or column being removed. The symbol file 704 might need to be modified to prune symbols that no longer corresponding to entries in the locality file (as shown in FIG. 7). The resulting normalized data is represented by the matrix 720.

In an alternative approach to performing an irregular remove on a data edge index, the data analytics module 112 may insert descriptive entries in the manifest files of the data edge index to indicate the normalized shape of the data source. Assuming the same example shown in FIG. 7, to "remove" the sixth column (Column6) which only appears in the first row, the data analytics module 112 may insert a descriptive entry in the manifest files indicating a five-column shape to the data source. In another example, the data analytics module 112 may normalize the data by adding a descriptive entry to the manifest file indicating the last row should be disregarded based on a determination that the last row has a shape (i.e., many Strings) that is completely dissimilar from the other row shapes. It is noted that the original raw data of the last row is preserved within the original raw locality file, and is dynamically "removed" using the manifest files at time of retrieval or materialization. In general, to "delete" a row or column of data, the data analytics module 112 may insert descriptive entries in the manifest segment associated with the locality file 706, the descriptive entries indicating a normalized schema or shape of the data, which result in the positions of the locality file representing a particular row or column being discarded or changed during analysis or retrieval. During materialization of the data set, the data analysis service may compare the "physical" shape of the locality values in the locality files with the "logical" shape specified in the manifest, and then perform a fill on any virtual columns identified by this comparison (e.g., "fill" a virtualized column with empty string cells). Similarly, in response to determining that the physical shape of locality values for a given row in the locality file has less columns than a logical shape specified in the manifest, the data analysis service may omit data from the materialized view corresponding to the locality values of any column that is not defined in the normalized schema.

Figure 8:
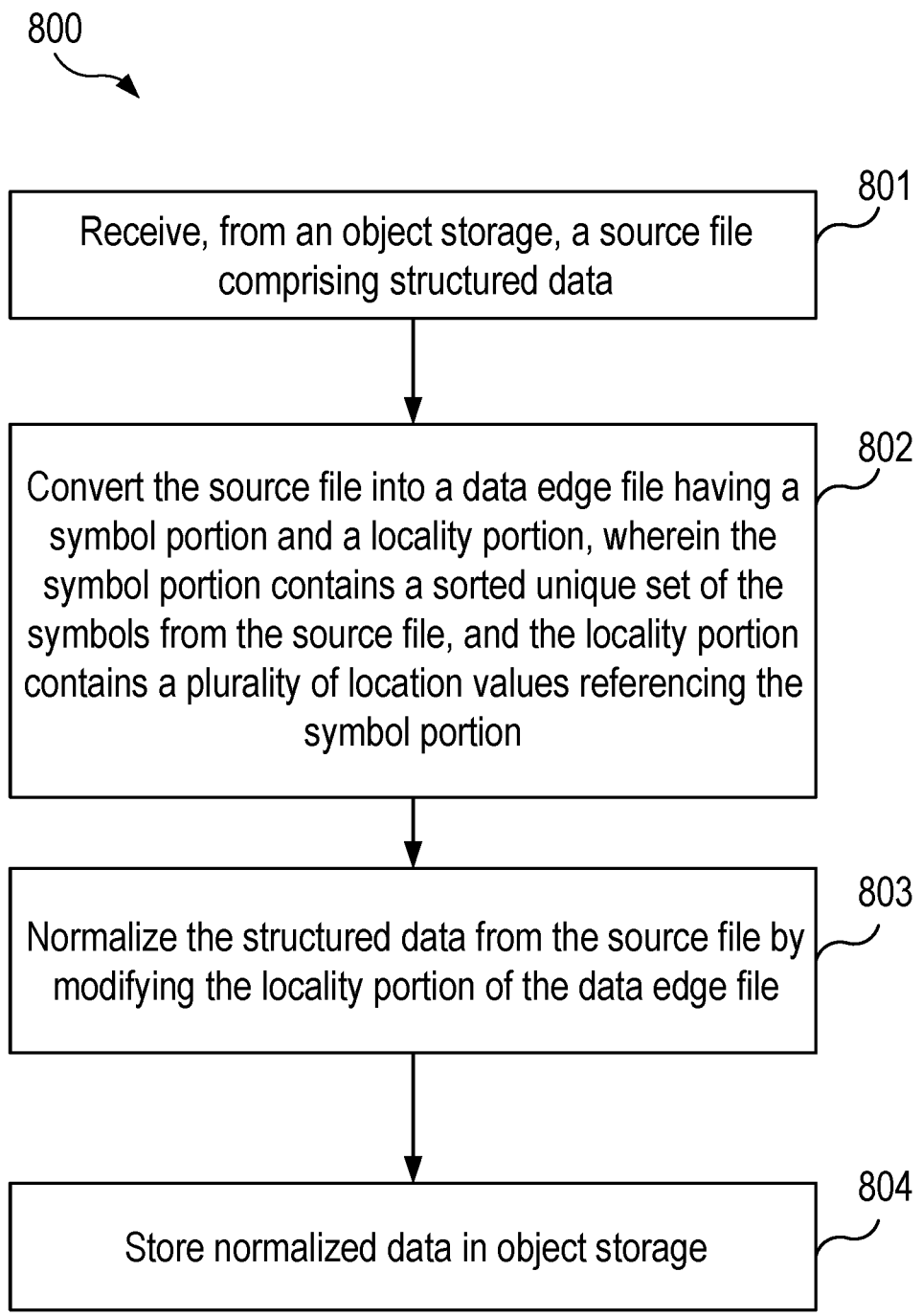
FIG. 8 is a flowchart illustrating a method for processing and storing a file in object storage according to an exemplary aspect.

FIG. 8 is a flowchart illustrating a method 800 for processing and normalizing a file in object storage according to an exemplary aspect. It is noted that the following description of the exemplary method makes reference to the system and components described above.

The method 800 begins at step 801, in which the data analysis service receives, from an object storage, a source file comprising structured data. In some aspects, the source file comprises structured data, and the location values are ordered within the locality file by one of a row orientation or a column orientation. In some aspects, the source file includes at least one of a comma-separated values (CSV) file having a plurality of records, each record comprising a plurality of fields separated by a delimiter character.

At step 802, the data analysis service 106 (e.g., using the file converter 110) converts the source file into a data edge file having a symbol portion and a locality portion. The symbol portion contains a sorted unique set of the symbols from the source file, and the locality portion contains a plurality of location values referencing the symbol portion. In some aspects, each of the symbols is stored at a corresponding location within the symbol portion, and a location value at a respective position within the locality portion represents an occurrence in the source file of a corresponding symbol identified by the respective location value.

At step 803, the data analysis service 106 (e.g., using the file converter 110, or analytics module 112) normalizes the structured data from the source file by modifying the locality portion of the data edge file to include at least one empty locality value at a respective position within the locality file representing an omission of data at the respective position in the source file. In some aspects, the file converter 110 may determine a maximum column count of the structured data, and responsive to determining that a record of the structured data has less values than the maximum column count, insert an empty locality value in the record. In some aspects, the analytics module 112 may determine shape information for a record in the data edge file based on the at least one empty locality value. In response to determining that the record has an anomalous shape based on the shape information, the analytics module 112 may remove one or more location values from the locality value to achieve a regular shape of the structured data.

In some aspects, the analytics module 112 may replace, in the data edge file, at least one empty locality value associated with a column with a statistical value associated with the column. The statistical value associated with the column may be at least one of a median value of the column, a mean value of the column, a standard deviation of the column.

In some aspects, the analytics module 112 may generate a plurality of statistical values about the structured data. In this case, normalizing the structured data from the source file by modifying the locality portion of the data edge file is performed based at least in part on the generated plurality of statistical values.

At step 804, the analytics module 112 may store the normalized version of the source data in object storage 103. In some aspects, the analytics module 112 may store the normalized version of the data in a same bucket 108 in object storage that the source file was contained in. In conventional normalization techniques such as ETL, full copies of source data are dumped into a separate data repository system, and pre-processed in an ad hoc manner by a human database analyst into a form that can be queried and analyzed. As mentioned above, aspects of the present disclosure provide a lossless technique for storing, compressing, and normalizing data without using large amounts of separate storage or computing resources, but rather is performed "in-place" in object storage.

Figure 11:
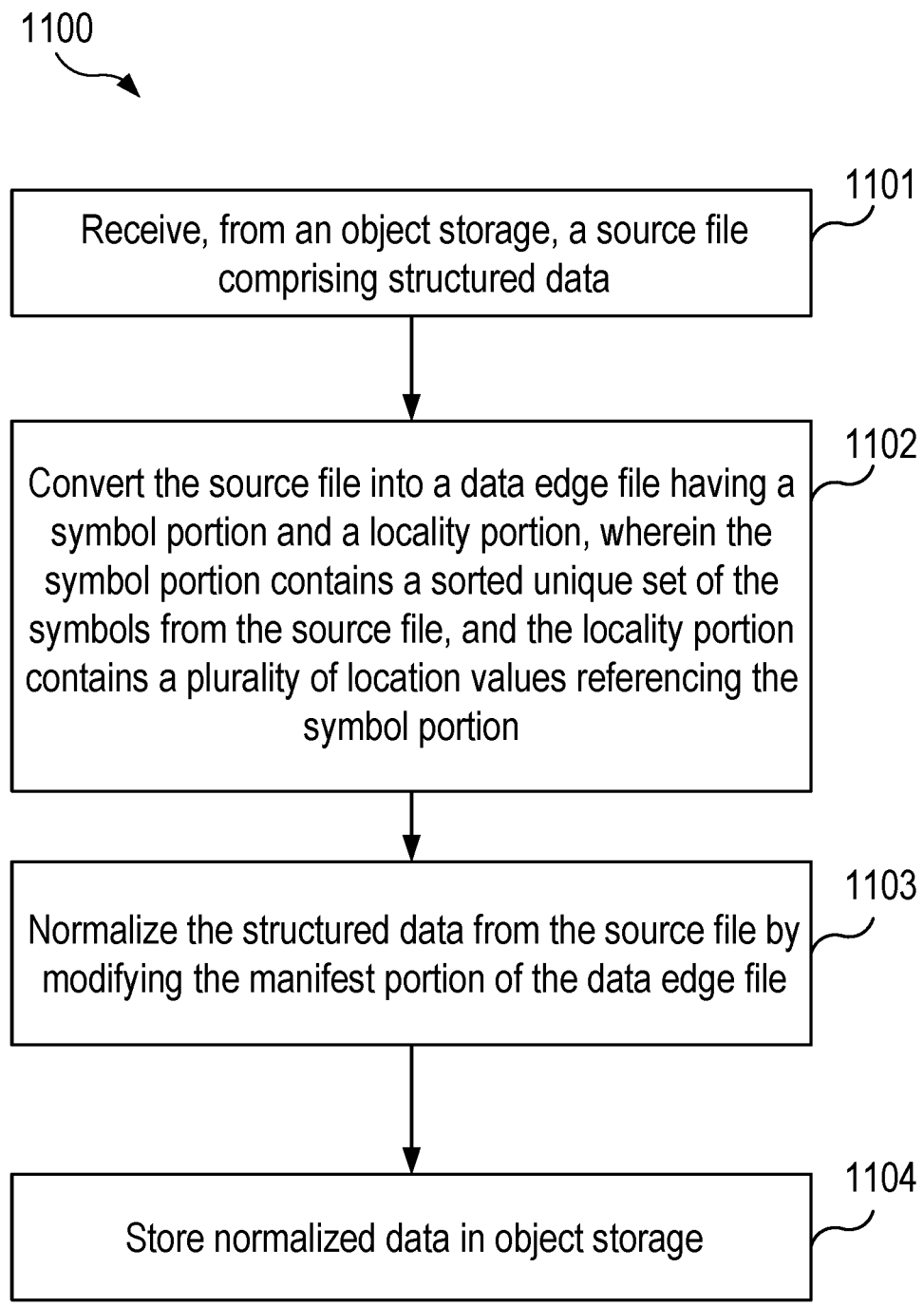
FIG. 11 is a flowchart illustrating a method for normalizing data of files in object storage according to an exemplary aspect.

FIG. 11 is a flowchart illustrating another method 1100 for normalizing data of files in object storage according to an exemplary aspect. It is noted that the following description of the exemplary method makes reference to the system and components described above.

The method 1100 begins at step 1102, in which the data analysis service receives, from an object storage, a source file having data comprising at least one of structured data and semi-structured data. In some aspects, the data of the source file is semi-structured data comprising attribute-value pairs and array data types. In an aspect, the source file is structured data, and the location values are ordered within the locality file by one of a row orientation or a column orientation.

At step 1104, the data analysis service 106 (e.g., using the file converter 110) converts the source file into a data edge file having a manifest portion, a symbol portion, and a locality portion. The symbol portion contains a sorted unique set of the symbols from the source file, and the locality portion contains a plurality of location values referencing the symbol portion. In some aspects, each of the symbols is stored at a corresponding location within the symbol portion, wherein a location value at a respective position within the locality portion represents an occurrence in the source file of a corresponding symbol identified by the respective location value.

In the case of source data having semi-structured data (e.g., JSON files), the file converter 110 may generate a plurality of data segments that are arranged in flattened two-dimensional representation of the array data types in the semi-structured data. Each array data type is restructured into a separate data segment and referenced by a join identifier. The file converter may then generate a plurality of self-join statements that are stored in the manifest portion of the data edge file, and are configured to reconstruct the original semi-structured data.

At step 1106, the data analysis service 106 (e.g., using the file converter 110 or analytics module 112) normalizes the data from the source file by modifying the manifest portion of the data edge file to include a description of at least one nonexistent column representing an omission of data at an associated position in the source file. In some aspects, the data analysis service may normalize the data from the source file by determining a maximum column count of the data, and responsive to determining that a record of the data has less values than the maximum column count, insert a description of the at least one nonexistent column in the manifest portion associated with the record. In some aspects, the file converter may normalize the data from the source file by determining shape information for a record in the data edge file, and in response to determining that the record has an anomalous shape based on the shape information, insert a descriptive entry in the manifest portion indicating one or more location values from the locality portion is to be disregarded to achieve a regular shape of the data. In some aspects, the data analysis service 106 (e.g., using the file converter 110 or analytics module 112) normalizes the data from the source file by generating a normalized schema of the data specifying a shape of the data. The shape of the data may specify an enumeration of columns, data type of each column, and an order of the columns.

At step 1108, the analytics module 112 may store the normalized version of the source data in object storage 103. In some aspects, the analytics module 112 may store the normalized version of the data in a same bucket 108 in object storage that the source file was contained in. In conventional normalization techniques such as ETL, full copies of source data are dumped into a separate data repository system, and pre-processed in an ad hoc manner by a human database analyst into a form that can be queried and analyzed. As mentioned above, aspects of the present disclosure provide a lossless technique for storing, compressing, and normalizing data without using large amounts of separate storage or computing resources, but rather is performed "in-place" in object storage.

In some aspects, the file converter may insert, in the manifest portion of the data edge file, a descriptive entry indicating at least one empty locality value associated with a column is to be replaced with a statistical value associated with the column, wherein the statistical value is maintained for each column of the data (e.g., in the manifest portion). For example, the statistical value associated with the column may include at least one of a median value of the column, a mean value of the column, and a standard deviation of the column. In some aspects, the data analysis service 106 may generate a plurality of statistical values about the data, the plurality of statistical values being stored in the manifest portion. When normalizing the data from the source file by modifying the manifest portion of the data edge file, the data analysis may do so based at least in part on the generated plurality of statistical values.

In some aspects, the data analysis server 106 may receive one or more requests to retrieve and/or analyze at least a portion of the data of the source file. Such requests may include search queries, analytical queries, and/or storage access requests. In response to such requests, the data analysis server 106 may generate a materialized view of the data that incorporates the normalized schema specified by the manifest file. To generate the materialized view, the data analysis server 106 determines, for a given row of data in the data edge file, whether the row deviates from the normalized schema and in what manner. Based on such determination, the data analysis service modifies the materialized view to insert certain values (e.g., empty string values) or omit existing raw data values so as to create a well-formed shape that is consistent with the normalized schema specified by the manifest file. In some aspects, the values inserted into the materialized view can be generated based on statistical values (also specified in the manifest portion) derived from the processing the columns of raw data.

Figure 12:
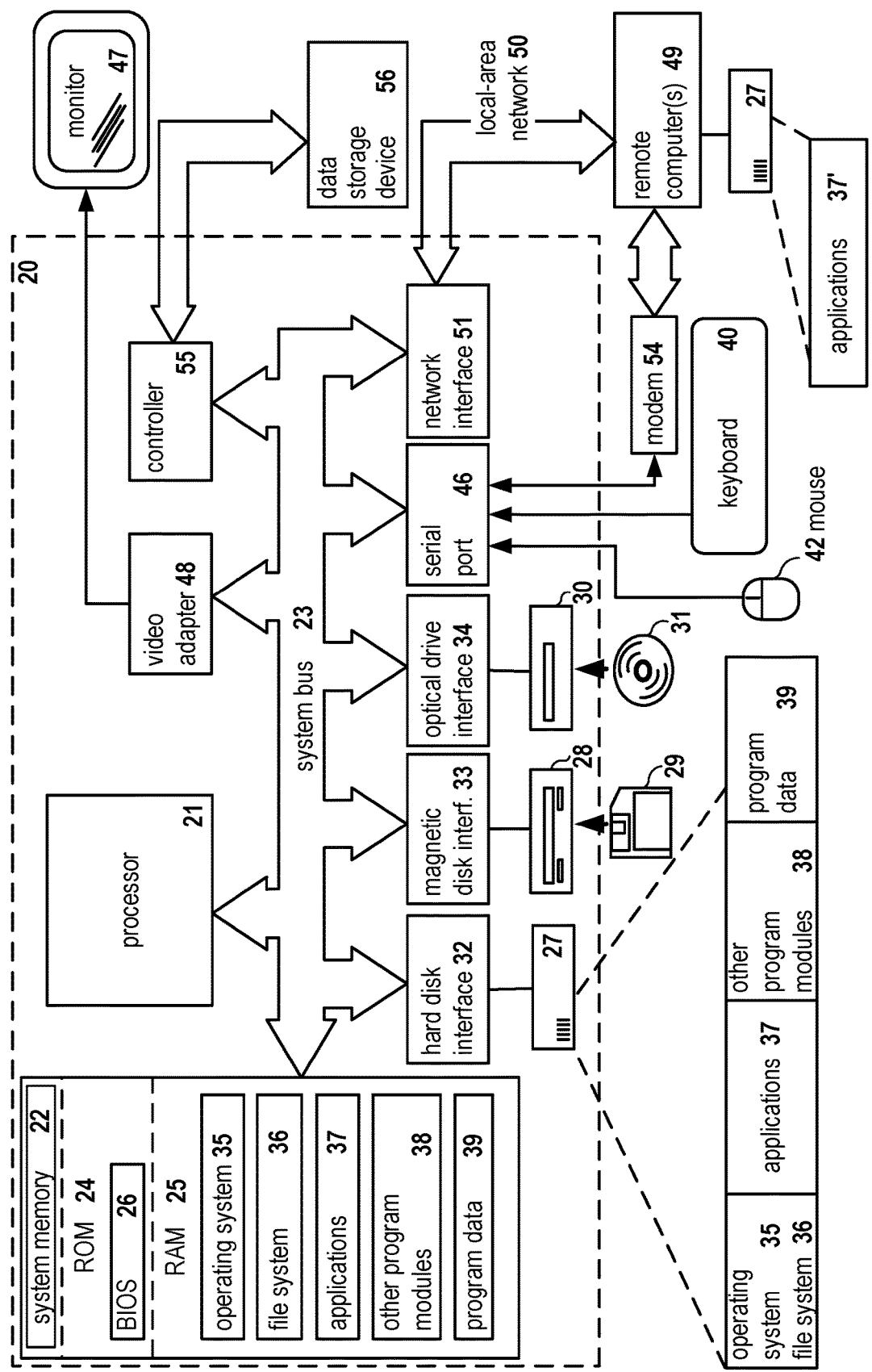
FIG. 12 is a block diagram of a general-purpose computer system on which the disclosed system and method can be implemented according to an exemplary aspect.

FIG. 12 is a block diagram illustrating a general-purpose computer system 20 on which aspects of systems and methods for processing files stored in object storage systems may be implemented in accordance with an exemplary aspect. It should be noted that the computer system 20 can correspond to the computing device 101, the object-based storage system 103, and the physical server(s) on which the data analysis service 106 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transforms the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 9, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing a file in object storage, comprising:
   receiving, from the object storage, a source file having data comprising at least one of structured data and semi-structured data;
   converting the source file into a data edge file having a manifest portion, a symbol portion, and a locality portion, wherein the symbol portion contains a sorted unique set of symbols from the source file, and the locality portion contains a plurality of location values referencing the symbol portion, the symbol portion and the locality portion of the data edge file providing lossless compression of the source file; and
   normalizing the data from the source file by modifying the manifest portion of the data edge file to include a description of at least one nonexistent column representing an omission of the data at an associated position in the source file, the manifest portion, the symbol portion, and the locality portion of the data edge file eliminating redundant data and providing statistics associated with the data of the source file.

2. The computer-implemented method of claim 1, wherein normalizing the data from the source file by modifying the manifest portion of the data edge file comprises:
   determining a maximum column count of the data; and
   responsive to determining that a record of the data has less values than the maximum column count, inserting the description of the at least one nonexistent column in the manifest portion associated with the record.

3. The computer-implemented method of claim 1, further comprising:
   inserting, in the manifest portion of the data edge file, a descriptive entry indicating that at least one empty locality value associated with a column is to be replaced with a statistical value associated with the column, wherein the statistical value is maintained for each column of the data.

4. The computer-implemented method of claim 3, wherein the statistical value associated with the column comprises at least one of a median value of the column, a mean value of the column, and a standard deviation of the column.

5. The computer-implemented method of claim 1, wherein normalizing the data from the source file by modifying the manifest portion of the data edge file comprises:
   determining shape information for a record in the data edge file; and
   responsive to determining that the record has an anomalous shape based on the shape information, inserting a descriptive entry in the manifest portion indicating that one or more location values from the locality portion is to be disregarded to achieve a regular shape of the data.

6. The computer-implemented method of claim 1, further comprising:
   generating a plurality of statistical values about the data, the plurality of statistical values being stored in the manifest portion;
   wherein normalizing the data from the source file by modifying the manifest portion of the data edge file is performed based at least in part on the plurality of statistical values.

7. The computer-implemented method of claim 1, wherein each symbol of the source file is stored at a corresponding location within the symbol portion, wherein a location value at a respective position within the locality portion represents an occurrence in the source file of a corresponding symbol identified by a respective location value.

8. The computer-implemented method of claim 1, wherein the source file comprises the structured data, and wherein the plurality of location values are ordered within the locality portion by one of a row orientation or a column orientation.

9. The computer-implemented method of claim 1, wherein the data of the source file is the semi-structured data comprising attribute-value pairs and array data types, wherein converting the source file into the data edge file further comprises:
   generating a plurality of data segments that are arranged in a flattened two-dimensional representation of the array data types in the semi-structured data, wherein each array data type is restructured into a separate data segment and referenced by a join identifier; and
   generating a plurality of self-join statements that are stored in the manifest portion of the data edge file, wherein the plurality of self-join statements are configured to reconstruct an original structure of the semi-structured data.

10. A computer apparatus for storing a file in object storage, comprising:
   a memory; and
   at least one processor coupled to the memory and configured to:
      receive, from the object storage, a source file having data comprising at least one of structured data and semi-structured data;
      convert the source file into a data edge file having a manifest portion, a symbol portion, and a locality portion, wherein the symbol portion contains a sorted unique set of symbols from the source file, and the locality portion contains a plurality of location values referencing the symbol portion, the symbol portion and the locality portion of the data edge file providing lossless compression of the source file; and
      normalize the data from the source file by modifying the manifest portion of the data edge file to include a description of at least one nonexistent column representing an omission of the data at an associated position in the source file, the manifest portion, the symbol portion, and the locality portion of the data edge file eliminating redundant data and providing statistics associated with the data of the source file.

11. The computer apparatus of claim 10, wherein to normalize the data from the source file by modifying the manifest portion of the data edge file, the at least one processor is further configured to:
   determine a maximum column count of the data; and
   responsive to determining that a record of the data has less values than the maximum column count, insert the description of the at least one nonexistent column in the manifest portion associated with the record.

12. The computer apparatus of claim 10, wherein the at least one processor is further configured to:
   insert, in the manifest portion of the data edge file, a descriptive entry indicating that at least one empty locality value associated with a column is to be replaced with a statistical value associated with the column, wherein the statistical value is maintained for each column of the data.

13. The computer apparatus of claim 12, wherein the statistical value associated with the column comprises at least one of a median value of the column, a mean value of the column, and a standard deviation of the column.

14. The computer apparatus of claim 10, wherein to normalize the data from the source file by modifying the manifest portion of the data edge file, the at least one processor is further configured to:
   determine shape information for a record in the data edge file; and
   responsive to determining that the record has an anomalous shape based on the shape information, insert a descriptive entry in the manifest portion indicating that one or more location values from the locality portion is to be disregarded to achieve a regular shape of the data.

15. The computer apparatus of claim 10, wherein the at least one processor is further configured to:
   generate a plurality of statistical values about the data, the plurality of statistical values being stored in the manifest portion, wherein normalizing the data from the source file by modifying the manifest portion of the data edge file is performed based at least in part on the plurality of statistical values.

16. The computer apparatus of claim 10, wherein each symbol of the source file is stored at a corresponding location within the symbol portion, wherein a location value at a respective position within the locality portion represents an occurrence in the source file of a corresponding symbol identified by a respective location value.

17. The computer apparatus of claim 10, wherein the source file comprises the structured data, and wherein the plurality of location values are ordered within the locality portion by one of a row orientation or a column orientation.

18. The computer apparatus of claim 10, wherein the data of the source file is the semi-structured data comprising attribute-value pairs and array data types, wherein to convert the source file into the data edge file, the at least one processor is further configured to:
   generate a plurality of data segments that are arranged in a flattened two-dimensional representation of the array data types in the semi-structured data, wherein each array data type is restructured into a separate data segment and referenced by a join identifier; and
   generate a plurality of self-join statements that are stored in the manifest portion of the data edge file, wherein the plurality of self-join statements are configured to reconstruct an original structure of the semi-structured data.

19. A non-transitory computer-readable medium storing computer executable code for storing a file in object storage, the computer executable code, when executed, to cause a processor to at least:
   receive, from the object storage, a source file having data comprising at least one of structured data and semi-structured data;
   convert the source file into a data edge file having a manifest portion, a symbol portion, and a locality portion, wherein the symbol portion contains a sorted unique set of symbols from the source file, and the locality portion contains a plurality of location values referencing the symbol portion, the symbol portion and the locality portion of the data edge file providing lossless compression of the source file; and
   normalize the data from the source file by modifying the manifest portion of the data edge file to include a description of at least one nonexistent column representing an omission of the data at an associated position in the source file, the manifest portion, the symbol portion, and the locality portion of the data edge file eliminating redundant data and providing statistics associated with the data of the source file.

20. The non-transitory computer-readable medium of claim 19, wherein the data of the source file is the semi-structured data comprising attribute-value pairs and array data types, wherein to convert the source file into the data edge file, the computer executable code, when executed, causes the processor to:
   generate a plurality of data segments that are arranged in a flattened two-dimensional representation of the array data types in the semi-structured data, wherein each array data type is restructured into a separate data segment and referenced by a join identifier; and
   generate a plurality of self-join statements that are stored in the manifest portion of the data edge file, wherein the plurality of self-join statements are configured to reconstruct an original structure of the semi-structured data.

* * * * *